United States Patent
Lai et al.

(10) Patent No.: US 10,948,690 B2
(45) Date of Patent: Mar. 16, 2021

(54) PHOTOGRAPHING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Syuan Ruei Lai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 155 days.

(21) Appl. No.: 16/388,412

(22) Filed: Apr. 18, 2019

(65) Prior Publication Data
US 2020/0174224 A1 Jun. 4, 2020

(30) Foreign Application Priority Data
Dec. 3, 2018 (TW) .................................. 107143262

(51) Int. Cl.
*G02B 9/60* (2006.01)
*G02B 7/02* (2021.01)
*H04N 5/225* (2006.01)
*G02B 13/00* (2006.01)

(52) U.S. Cl.
CPC ............... *G02B 9/60* (2013.01); *G02B 7/021* (2013.01); *G02B 13/0045* (2013.01); *H04N 5/2254* (2013.01)

(58) Field of Classification Search
None
See application file for complete search history.

(56) References Cited

U.S. PATENT DOCUMENTS

| | | | |
|---|---|---|---|
| 2,443,156 A | 6/1948 | Altman et al. | |
| 3,176,583 A | 4/1965 | Klein | |
| 4,568,151 A | 2/1986 | Mihara | |
| 8,605,368 B2 | 12/2013 | Tsai et al. | |
| 8,736,977 B2 | 5/2014 | Tang et al. | |
| 9,091,801 B2 | 7/2015 | Huang | |
| 9,989,741 B1 | 6/2018 | Hsueh et al. | |
| 2017/0199360 A1 | 7/2017 | Chang | |
| 2018/0172957 A1* | 6/2018 | Lee | G02B 13/0045 |
| 2019/0056570 A1* | 2/2019 | Yeh | G02B 13/0045 |
| 2019/0346661 A1* | 11/2019 | Yeh | G02B 9/60 |

FOREIGN PATENT DOCUMENTS

| | | |
|---|---|---|
| JP | 1990-044308 | 2/1990 |
| JP | 2015001535 | 1/2015 |
| WO | 2016/197604 A1 | 12/2016 |

* cited by examiner

*Primary Examiner* — Darryl J Collins
(74) *Attorney, Agent, or Firm* — Maschoff Brennan

(57) ABSTRACT

A photographing optical lens assembly includes five lens elements which are, in order from an object side to an image side: a first lens element, a second lens element, a third lens element, a fourth lens element and a fifth lens element. The first lens element has positive refractive power. The third lens element has negative refractive power. The fifth lens element has negative refractive power. The photographing optical lens assembly has a total of five lens elements.

35 Claims, 21 Drawing Sheets

PHOTOGRAPHING OPTICAL LENS ASSEMBLY, IMAGE CAPTURING UNIT AND ELECTRONIC DEVICE

RELATED APPLICATIONS

This application claims priority to Taiwan Application 107143262, filed on Dec. 3, 2018, which is incorporated by reference herein in its entirety.

BACKGROUND

Technical Field

The present disclosure relates to a photographing optical lens assembly, an image capturing unit and an electronic device, more particularly to a photographing optical lens assembly and an image capturing unit applicable to an electronic device.

Description of Related Art

With the development of semiconductor manufacturing technology, the performance of image sensors has been improved, and the pixel size thereof has been scaled down. Therefore, high image quality becomes one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is yet difficult for a conventional optical system to obtain a balance among the requirements such as high image quality, low sensitivity, desirable aperture size, miniaturization or proper field of view. Accordingly, there is a need for an optical system that satisfies the aforementioned requirements.

SUMMARY

According to one aspect of the present disclosure, a photographing optical lens assembly includes five lens elements. The five lens elements are, in order from an object side to an image side, a first lens element, a second lens element, a third lens element, a fourth lens element and a fifth lens element. The first lens element has positive refractive power. The third lens element has negative refractive power. The fifth lens element has negative refractive power. The photographing optical lens assembly has a total of five lens elements. When an axial distance between the fourth lens element and the fifth lens element is T45, an axial distance between an object-side surface of the first lens element and an image-side surface of the third lens element is Dr1r6, a focal length of the photographing optical lens assembly is f, a focal length of the first lens element is f1, a focal length of the second lens element is f2, a focal length of the third lens element is f3, and a curvature radius of an object-side surface of the second lens element is R3, the following conditions are satisfied:

$0.55 < T45/Dr1r6;$ $|f3/f2| < 1.40;$ $|f1/f3| < 1.0;$ and $f/R3 < -1.25.$

According to another aspect of the present disclosure, an image capturing unit includes the aforementioned photographing optical lens assembly and an image sensor, wherein the image sensor is disposed on an image surface of the photographing optical lens assembly.

According to another aspect of the present disclosure, an electronic device includes the aforementioned image capturing unit.

According to another aspect of the present disclosure, a photographing optical lens assembly includes five lens elements. The five lens elements are, in order from an object side to an image side, a first lens element, a second lens element, a third lens element, a fourth lens element and a fifth lens element. The first lens element has positive refractive power. The third lens element has negative refractive power. The fifth lens element has negative refractive power. The photographing optical lens assembly has a total of five lens elements. When a focal length of the photographing optical lens assembly is f, a focal length of the first lens element is f1, a focal length of the second lens element is f2, a focal length of the third lens element is f3, an axial distance between the fourth lens element and the fifth lens element is T45, an axial distance between an object-side surface of the first lens element and an image-side surface of the third lens element is Dr1r6, and an axial distance between the object-side surface of the first lens element and an image surface is TL, the following conditions are satisfied:

$|f3/f2| < 1.0;$ $0.60 < T45/Dr1r6;$ $|f1/f3| < 1.0;$ and $TL/f < 1.0.$

According to another aspect of the present disclosure, a photographing optical lens assembly includes five lens elements. The five lens elements are, in order from an object side to an image side, a first lens element, a second lens element, a third lens element, a fourth lens element and a fifth lens element. The first lens element has positive refractive power. The third lens element has negative refractive power. The fifth lens element has negative refractive power. The photographing optical lens assembly has a total of five lens elements. When a focal length of the photographing optical lens assembly is f, a focal length of the second lens element is f2, a focal length of the third lens element is f3, a focal length of the fourth lens element is f4, a focal length of the fifth lens element is f5, an axial distance between the fourth lens element and the fifth lens element is T45, and an axial distance between an object-side surface of the first lens element and an image-side surface of the third lens element is Dr1r6, the following conditions are satisfied:

$0.60 < T45/Dr1r6;$ and $0 < |f/f3| - (|f/f2| + |f/f4| + |f/f5|).$

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical lens assembly includes five lens elements. The five lens elements are, in order from an object side to an image side, a first lens element, a second lens element, a third lens element, a fourth lens element and a fifth lens element. The photographing optical lens assembly has a total of five lens elements.

The first lens element has positive refractive power. Therefore, it is favorable for improving the light convergence of the photographing optical lens assembly, and reducing the total track length of the photographing optical lens assembly.

Figure 21:
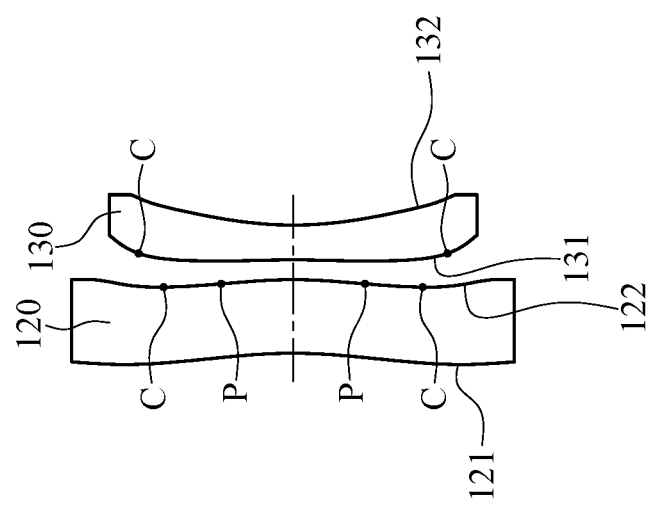
FIG. 21 shows a schematic view of inflection points and critical points of some of the first through fifth lens elements according to the 1st embodiment of the present disclosure.

The second lens element can have an object-side surface being concave in a paraxial region thereof, and the object-side surface of the second lens element can have at least one inflection point in an off-axis region thereof; therefore, it is favorable for the peripheral light rays traveling into the photographing optical lens assembly so as to prevent surface reflection due to overly curved shape at the peripheral region of the second lens element. The second lens element can have an image-side surface being convex in a paraxial region thereof, and the image-side surface of the second lens element can have at least one concave critical point in an off-axis region thereof; therefore, it is favorable for receiving peripheral light rays. Please refer to FIG. 21, which shows a schematic view of inflection points P and concave critical points C of the second lens element according to the 1st embodiment of the present disclosure.

The third lens element has negative refractive power; therefore, the third lens element with strong negative refractive power is favorable for balancing aberrations caused by miniaturization of the photographing optical lens assembly. The third lens element can have an object-side surface being concave in a paraxial region thereof and an image-side surface being concave in a paraxial region thereof; therefore, it is favorable for balancing the refractive power distribution on the object side and the image side so as to prevent improper correction of light path, thereby improving image quality. The object-side surface of the third lens element can have at least one convex critical point in an off-axis region thereof; therefore, it is favorable for correcting off-axis aberrations. Please refer to FIG. 21, which shows a schematic view of convex critical points C of the third lens element according to the 1st embodiment of the present disclosure.

The fourth lens element can have an image-side surface being concave in a paraxial region thereof. Therefore, it is favorable for reducing the back focal length so as to keep the photographing optical lens assembly compact.

The fifth lens element has negative refractive power; therefore, it is favorable for balancing the refractive power on the image side as well as correcting high-order aberrations. The fifth lens element can have an object-side surface being concave in a paraxial region thereof; therefore, the shape of the fifth lens element is favorable for correcting peripheral aberrations so as to further improve image quality.

When an axial distance between the fourth lens element and the fifth lens element is T45, and an axial distance between an object-side surface of the first lens element and the image-side surface of the third lens element is Dr1r6, the following condition is satisfied: 0.55<T45/Dr1r6. Therefore, it is favorable for providing sufficient space in the photographing optical lens assembly for accommodating the fifth lens element, such that the shape variation of the fifth lens element is favorable for correcting peripheral aberrations, thereby improving image quality on the off-axis region. Moreover, the following condition is also satisfied: 0.60<T45/Dr1r6. Moreover, the following condition is also satisfied: 0.65<T45/Dr1r6<2.0. Moreover, the following condition is also satisfied: 0.75<T45/Dr1r6<1.50.

When a focal length of the second lens element is f2, and a focal length of the third lens element is f3, the following condition can be satisfied: |f3/f2|<1.40. Therefore, it is favorable for arranging the refractive power of the photographing optical lens assembly so as to enhance aberration corrections. Moreover, the following condition can be also satisfied: |f3/f2|<1.0. Moreover, the following condition can be also satisfied: |f3/f2|<0.75. Moreover, the following condition can be also satisfied: |f3/f2|<0.50.

When a focal length of the first lens element is f1, and a focal length of the third lens element is f3, the following condition can be satisfied: |f1/f3|<1.0. Therefore, it is favorable for light rays converging on an image surface and reducing the total track length with sufficient refractive power of the photographing optical lens assembly, thereby maintaining a compact size.

When a focal length of the photographing optical lens assembly is f, and a curvature radius of the object-side surface of the second lens element is R3, the following condition can be satisfied: f/R3<−1.25. Therefore, it is favorable for the second lens element receiving peripheral incident light so as to enhance image brightness. Moreover, the following condition can be also satisfied: −7.0<f/R3<−1.50. Moreover, the following condition can be also satisfied: −5.0<f/R3<−2.0.

When an axial distance between the object-side surface of the first lens element and the image surface is TL, and the focal length of the photographing optical lens assembly is f, the following condition can be satisfied: TL/f<1.0. Therefore, it is favorable for enhancing telephoto of the photographing optical lens assembly so as to provide high functionality when configured with a wide angle camera. Moreover, the following condition can be also satisfied: 0.50<TL/f<0.90.

When the focal length of the photographing optical lens assembly is f, the focal length of the second lens element is f2, the focal length of the third lens element is f3, a focal length of the fourth lens element is f4, and a focal length of the fifth lens element is f5, the following condition can be satisfied: 0<|f/f3|−(|f/f2|+|f/f4|+|f/f5|). Therefore, it is favorable for arranging the refractive power of the photographing optical lens assembly so as to enhance aberration corrections in the off-axis region. Moreover, the following condition can be also satisfied: 0.25<|f/f3|−(|f/f2|+|f/f4|+|f/f5|)<3.0.

When a sum of axial distances between each of all adjacent lens elements of the photographing optical lens assembly is ΣAT, and the axial distance between the fourth lens element and the fifth lens element is T45, the following condition can be satisfied: 1.0<ΣAT/T45<2.0. Therefore, space between the fourth lens element and the image surface is favorable for accommodating the fifth lens element with a curved shape, such that the shape of the fifth lens element is favorable for correcting peripheral aberrations. Moreover, the following condition can be also satisfied: 1.05<ΣAT/T45<1.45.

When the focal length of the photographing optical lens assembly is f, and a curvature radius of the image-side surface of the fourth lens element is R8, the following condition can be satisfied: 0.75<f/R8. Therefore, it is favorable for reducing the back focal length so as to keep the photographing optical lens assembly compact.

When the focal length of the photographing optical lens assembly is f, and a curvature radius of an object-side surface of the fifth lens element is R9, the following condition can be satisfied: f/R9<−1.0. Therefore, it is favorable for arranging the shape of the fifth lens element so as to correct peripheral aberrations, thereby improving image quality. Moreover, the following condition can be also satisfied: −4.0<f/R9<−1.50.

When a maximum field of view of the photographing optical lens assembly is FOV, the following condition can be satisfied: tan(FOV)≤1.0. Therefore, it is favorable for obtaining a sufficient field of view with a telephoto configuration.

When an Abbe number of the fourth lens element is V4, and an Abbe number of the fifth lens element is V5, the following condition can be satisfied: 90<V4+V5. Therefore, it is favorable for correcting chromatic aberration.

When the axial distance between the fourth lens element and the fifth lens element is T45, a central thickness of the second lens element is CT2, and a central thickness of the third lens element is CT3, the following condition can be satisfied: 1.75<T45/(CT2+CT3)<4.0. Therefore, it is favorable for preventing insufficient space from overly large lens thicknesses or deformation of lens elements from overly small lens thicknesses due to the thicknesses configuration of the second lens element and the third lens element.

When the focal length of the third lens element is f3, and the axial distance between the fourth lens element and the fifth lens element is T45, the following condition can be satisfied: |f3/T45|<4.0. Therefore, it is favorable for arranging the larger axial distance between the fourth lens element and the fifth lens element as well as the larger refractive power of the third lens element, thereby providing the proper configuration of the four lens elements on the object side and the fifth lens element. Moreover, the following condition can be also satisfied: |f3/T45|<3.0. Moreover, the following condition can be also satisfied: |f3/T45|<2.5.

When a minimum value of each ratio of an Abbe number to a refractive index among all lens elements of the photographing optical lens assembly is V/N, the following condition can be satisfied: 5.0<V/N<12.0. Therefore, it is favorable for preventing excessive corrections of chromatic aberration.

According to the present disclosure, the aforementioned features and conditions can be utilized in numerous combinations so as to achieve corresponding effects.

According to the present disclosure, the lens elements of the photographing optical lens assembly can be made of either glass or plastic material. When the lens elements are made of glass material, the refractive power distribution of the photographing optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the photographing optical lens assembly can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof;

when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the photographing optical lens assembly, based on the corresponding image sensor, can be flat or curved, especially a curved surface being concave facing towards the object side of the photographing optical lens assembly.

According to the present disclosure, an image correction unit, such as a field flattener, can be optionally disposed between the lens element closest to the image side of the photographing optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens assembly and thereby provides a wider field of view for the same.

According to the present disclosure, the photographing optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
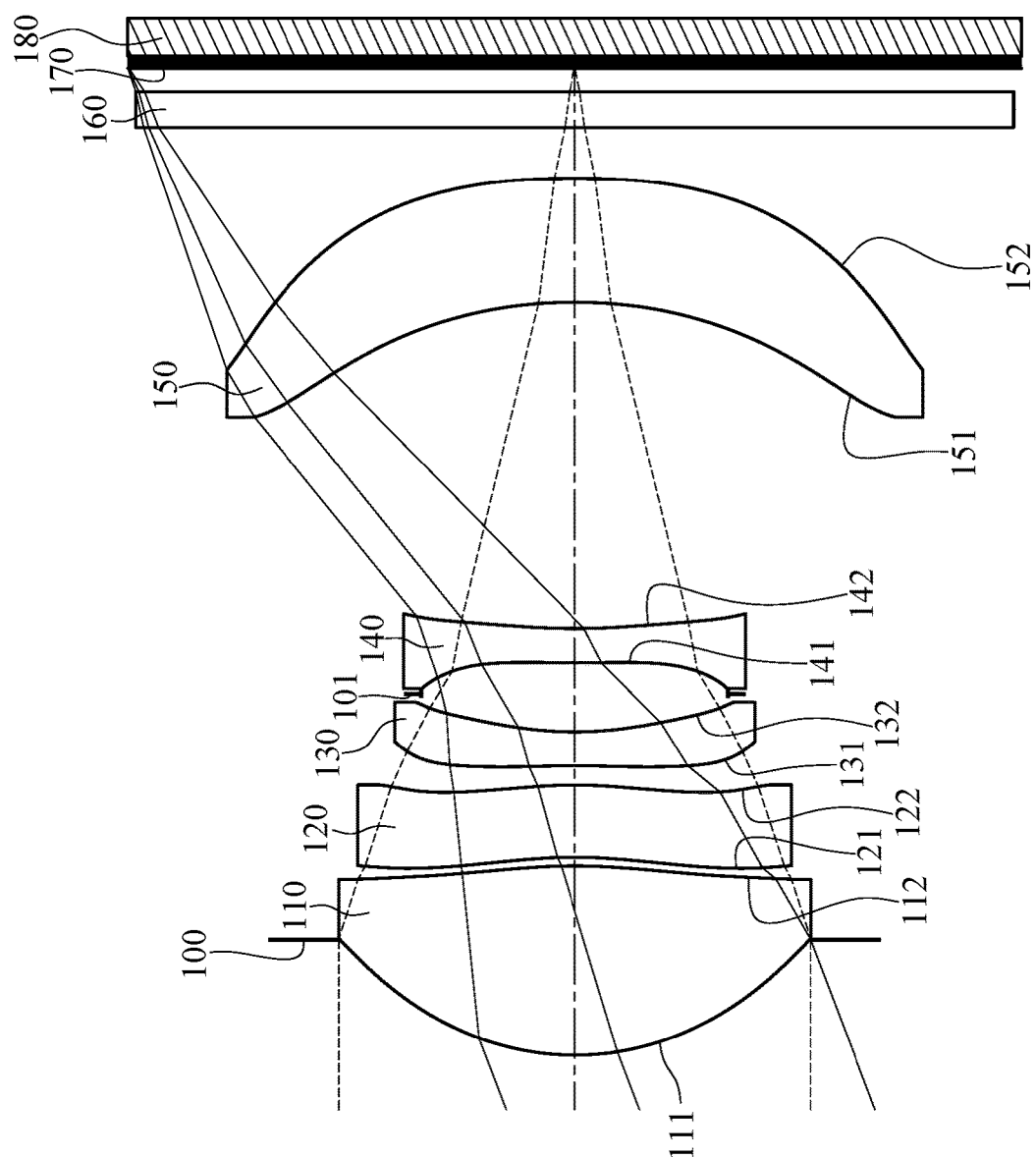
FIG. 1 is a schematic view of an image capturing unit according to the 1st embodiment of the present disclosure.
Figure 2:
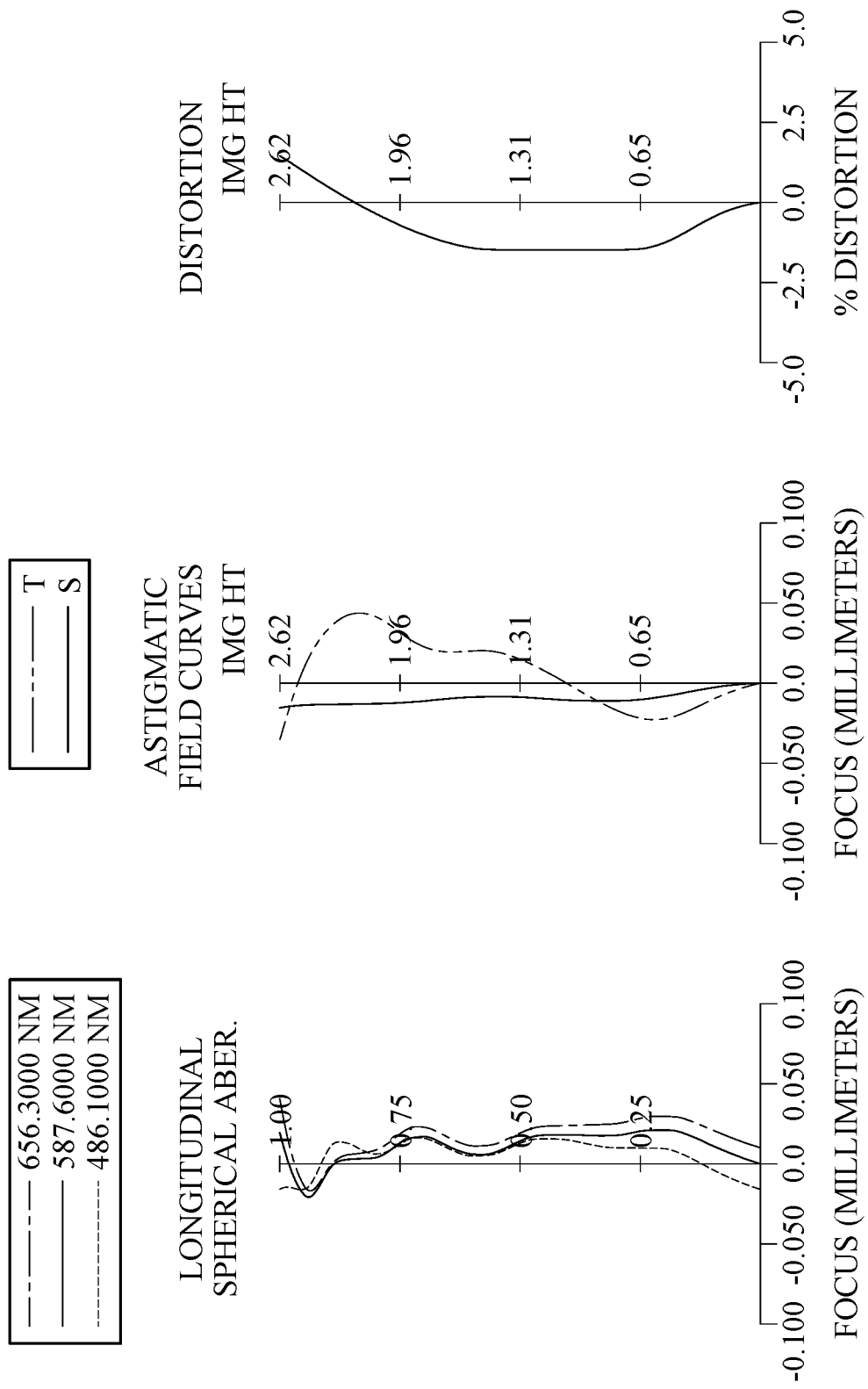
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens assembly (its reference numeral is omitted) of the present disclosure and an image sensor 180. The photographing optical lens assembly includes, in order from an object side to an image side, an aperture stop 100, a first lens element 110, a second lens element 120, a third lens element 130, a stop 101, a fourth lens element 140, a fifth lens element 150, an IR-cut filter 160 and an image surface 170. The photographing optical lens assembly includes five lens elements (110, 120, 130, 140 and 150) with no additional lens element disposed between each of the adjacent five lens elements.

The first lens element 110 with positive refractive power has an object-side surface 111 being convex in a paraxial region thereof and an image-side surface 112 being convex in a paraxial region thereof. The first lens element 110 is made of glass material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has at least one inflection point in an off-axis region thereof. The image-side surface 122 of the second lens element 120 has at least one concave critical point in an off-axis region thereof.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one convex critical point in an off-axis region thereof.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The IR-cut filter 160 is made of glass material and located between the fifth lens element 150 and the image surface 170, and will not affect the focal length of the photographing optical lens assembly. The image sensor 180 is disposed on or near the image surface 170 of the photographing optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens assembly of the image capturing unit according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=6.78 millimeters (mm), Fno=2.45, HFOV=20.8 degrees (deg.).

When the maximum field of view of the photographing optical lens assembly is FOV, the following condition is satisfied: tan(FOV)=0.89, wherein FOV=41.6 degrees.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, and a minimum value of a ratio of Abbe number to refractive index among all lens elements of the photographing optical lens assembly is V/N, the following condition is satisfied: V/N=10.95. In this embodiment, the ratio of Abbe number to refractive index of the first lens element 110 (V1/N1) is 54.34, the ratio of Abbe number to refractive index of the second lens element 120 (V2/N2) is 10.95, the ratio of Abbe number to refractive index of the third lens element 130 (V3/N3) is 36.22, the ratio of Abbe number to refractive index of the fourth lens element 140 (V4/N4) is 36.22, the ratio of Abbe number to refractive index of the fifth lens element 150 (V5/N5) is 36.45, and thus V/N=V2/N2.

When the Abbe number of the fourth lens element 140 is V4, and the Abbe number of the fifth lens element 150 is V5, the following condition is satisfied: V4+V5=111.9.

When an axial distance between the fourth lens element 140 and the fifth lens element 150 is T45, a central thickness of the second lens element 120 is CT2, and a central thickness of the third lens element 130 is CT3, the following condition is satisfied: T45/(CT2+CT3)=3.08. In this embodiment, an axial distance between each of adjacent lens elements is the air gap in a paraxial region between the two adjacent lens elements.

When the axial distance between the fourth lens element 140 and the fifth lens element 150 is T45, and an axial distance between the object-side surface 111 of the first lens element 110 and the image-side surface 132 of the third lens element 130 is Dr1r6, the following condition is satisfied: T45/Dr1r6=1.01.

When a sum of axial distances between each of all adjacent lens elements of the photographing optical lens assembly is ΣAT, and the axial distance between the fourth lens element 140 and the fifth lens element 150 is T45, the following condition is satisfied: ΣAT/T45=1.30. In this embodiment, ΣAT is the sum of axial distances between two of the first lens element 110, the second lens element 120, the third lens element 130, the fourth lens element 140 and the fifth lens element 150 that are adjacent to each other.

When an axial distance between the object-side surface 111 of the first lens element 110 and the image surface 170 is TL, and the focal length of the photographing optical lens assembly is f, the following condition is satisfied: TL/f=0.86.

When a focal length of the first lens element 110 is f1, and a focal length of the third lens element 130 is f3, the following condition is satisfied: |f1/f3|=0.83.

When the focal length of the third lens element 130 is f3, and the axial distance between the fourth lens element 140 and the fifth lens element 150 is T45, the following condition is satisfied: |f3/T45|=1.44.

When a focal length of the second lens element 120 is f2, and the focal length of the third lens element 130 is f3, the following condition is satisfied: |f3/f2|=0.09.

When the focal length of the photographing optical lens assembly is f, and a curvature radius of the object-side surface 121 of the second lens element 120 is R3, the following condition is satisfied: f/R3=−2.53.

When the focal length of the photographing optical lens assembly is f, and a curvature radius of the image-side surface 142 of the fourth lens element 140 is R8, the following condition is satisfied: f/R8=1.70.

When the focal length of the photographing optical lens assembly is f, and a curvature radius of the object-side surface 151 of the fifth lens element 150 is R9, the following condition is satisfied: f/R9=−2.35.

When the focal length of the photographing optical lens assembly is f, the focal length of the second lens element 120 is f2, the focal length of the third lens element 130 is f3, a focal length of the fourth lens element 140 is f4, and a focal length of the fifth lens element 150 is f5, the following condition is satisfied: |f/f3|−(1f/f2|+1f/f4|+|f/f5|)=0.90.

The detailed optical data of the 1st embodiment are shown in Table 1 and the aspheric surface data are shown in Table 2 below.

TABLE 1

1st Embodiment
f = 6.78 mm, Fno = 2.45, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.680 | | | | |
| 2 | Lens 1 | 1.600 | (ASP) | 1.111 | Glass | 1.497 | 81.4 | 2.30 |
| 3 | | −3.089 | (ASP) | 0.051 | | | | |
| 4 | Lens 2 | −2.675 | (ASP) | 0.423 | Plastic | 1.680 | 18.4 | 30.45 |
| 5 | | −2.521 | (ASP) | 0.114 | | | | |
| 6 | Lens 3 | −4.611 | (ASP) | 0.200 | Plastic | 1.544 | 55.9 | −2.77 |
| 7 | | 2.265 | (ASP) | 0.224 | | | | |
| 8 | Stop | Plano | | 0.183 | | | | |
| 9 | Lens 4 | 12.919 | (ASP) | 0.200 | Plastic | 1.544 | 55.9 | −10.70 |
| 10 | | 3.988 | (ASP) | 1.917 | | | | |
| 11 | Lens 5 | −2.882 | (ASP) | 0.727 | Plastic | 1.534 | 55.9 | −9.73 |
| 12 | | −7.044 | (ASP) | 0.300 | | | | |
| 13 | IR-cut Filter | Plano | | 0.210 | Glass | 1.517 | 64.2 | — |
| 14 | | Plano | | 0.136 | | | | |
| 15 | Image | Plano | | — | | | | |

Note:
Reference wavelength is 587.6 nm (d-line).
An effective radius of the stop 101 (Surface 8) is 0.900 mm.
An effective radius of the object-side surface 151 (Surface 11) is 1.880 mm.

TABLE 2

Aspheric Coefficients

| Surface # | 2 | 3 | 4 | 5 | 6 |
|---|---|---|---|---|---|
| k = | −2.4437E−01 | −1.6532E+01 | −2.3582E+00 | 2.2189E+00 | 1.0954E+01 |
| A4 = | −1.9833E−02 | 2.3780E−01 | 3.2991E−01 | 5.2687E−01 | 7.7318E−01 |
| A6 = | 1.2397E−01 | −8.1852E−01 | −9.5533E−01 | −1.3509E+00 | −3.4733E+00 |
| A8 = | −4.0693E−01 | 2.1723E+00 | 2.6147E+00 | 3.2260E+00 | 1.2064E+01 |
| A10 = | 7.7291E−01 | −3.9178E+00 | −5.0615E+00 | −5.3975E+00 | −2.9410E+01 |
| A12 = | −9.0507E−01 | 4.7814E+00 | 6.7042E+00 | 6.4358E+00 | 5.0183E+01 |
| A14 = | 6.5984E−01 | −3.8829E+00 | −5.9046E+00 | −5.5612E+00 | −5.7856E+01 |
| A16 = | −2.9165E−01 | 1.9931E+00 | 3.2778E+00 | 3.4712E+00 | 4.2772E+01 |
| A18 = | 7.1299E−02 | −5.8080E−01 | −1.0306E+00 | −1.4047E+00 | −1.8176E+01 |
| A20 = | −7.3785E−03 | 7.2851E−02 | 1.3917E−01 | 2.6423E−01 | 3.3496E+00 |

| Surface # | 7 | 9 | 10 | 11 | 12 |
|---|---|---|---|---|---|
| k = | −1.2764E+01 | −8.8574E+01 | −2.6768E−01 | −1.2974E+00 | −6.4009E+01 |
| A4 = | 2.6235E−01 | −1.6933E−01 | −9.1123E−02 | −8.0616E−02 | −2.3420E−01 |
| A6 = | −1.3405E+00 | −8.4269E−01 | −8.8051E−02 | 1.7537E−01 | 3.4113E−01 |
| A8 = | 2.2435E+00 | 5.7657E+00 | 2.3701E−01 | −2.5141E−01 | −3.6656E−01 |
| A10 = | 6.3433E+00 | −2.7537E+01 | 1.7230E−01 | 2.0992E−01 | 2.4858E−01 |
| A12 = | −4.2848E+01 | 8.3099E+01 | −1.1026E+00 | −1.0669E−01 | −1.0996E−01 |
| A14 = | 1.0364E+02 | −1.5488E+02 | 1.9299E+00 | 3.3434E−02 | 3.1897E−02 |
| A16 = | −1.3325E+02 | 1.7230E+02 | −1.7560E+00 | −6.2563E−03 | −5.8650E−03 |
| A18 = | 9.0576E+01 | −1.0431E+02 | 7.9220E−01 | 6.3679E−04 | 6.1903E−04 |
| A20 = | −2.5674E+01 | 2.6185E+01 | −1.3455E−01 | −2.6926E−05 | −2.8406E−05 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
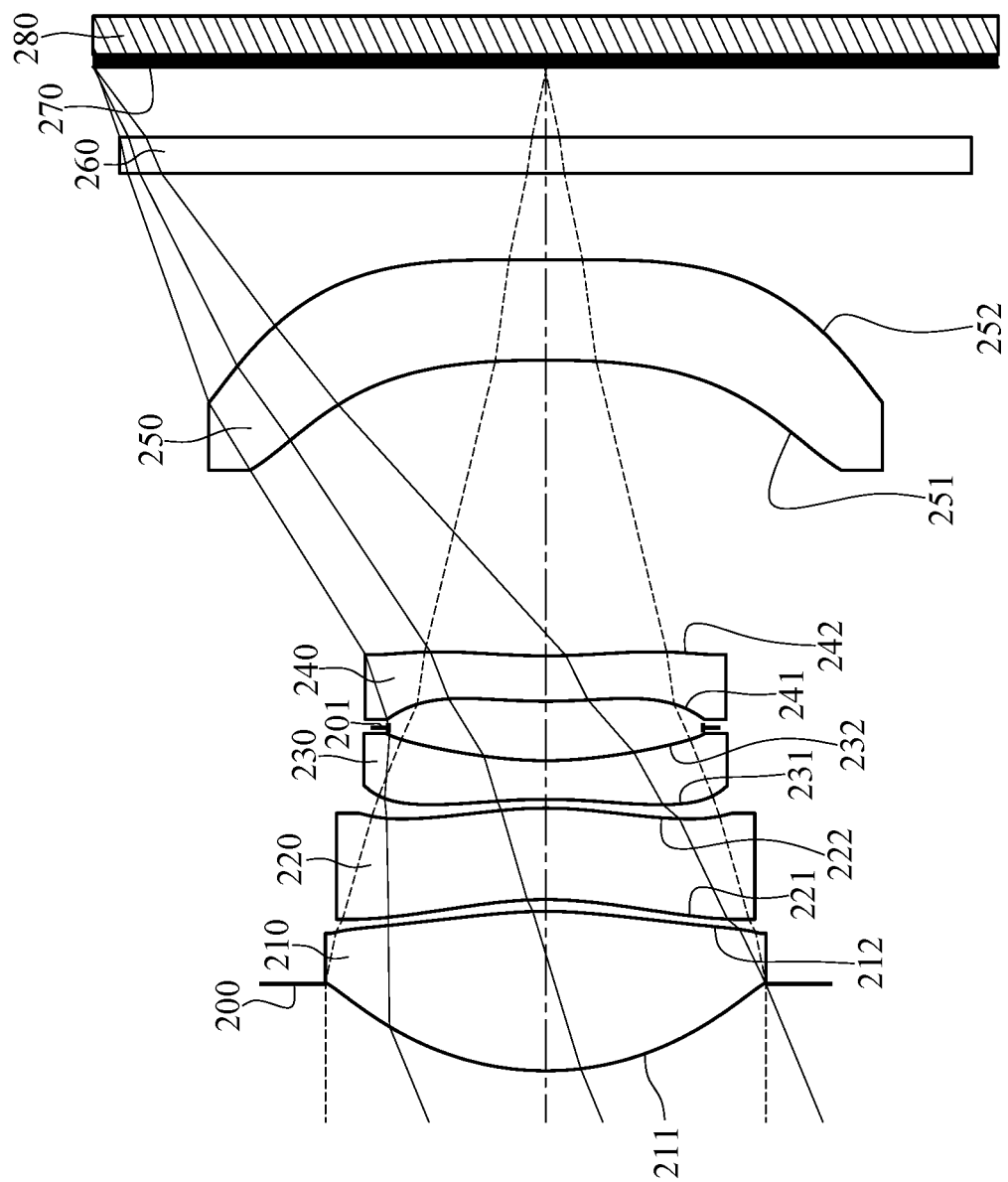
FIG. 3 is a schematic view of an image capturing unit according to the 2nd embodiment of the present disclosure.
Figure 4:
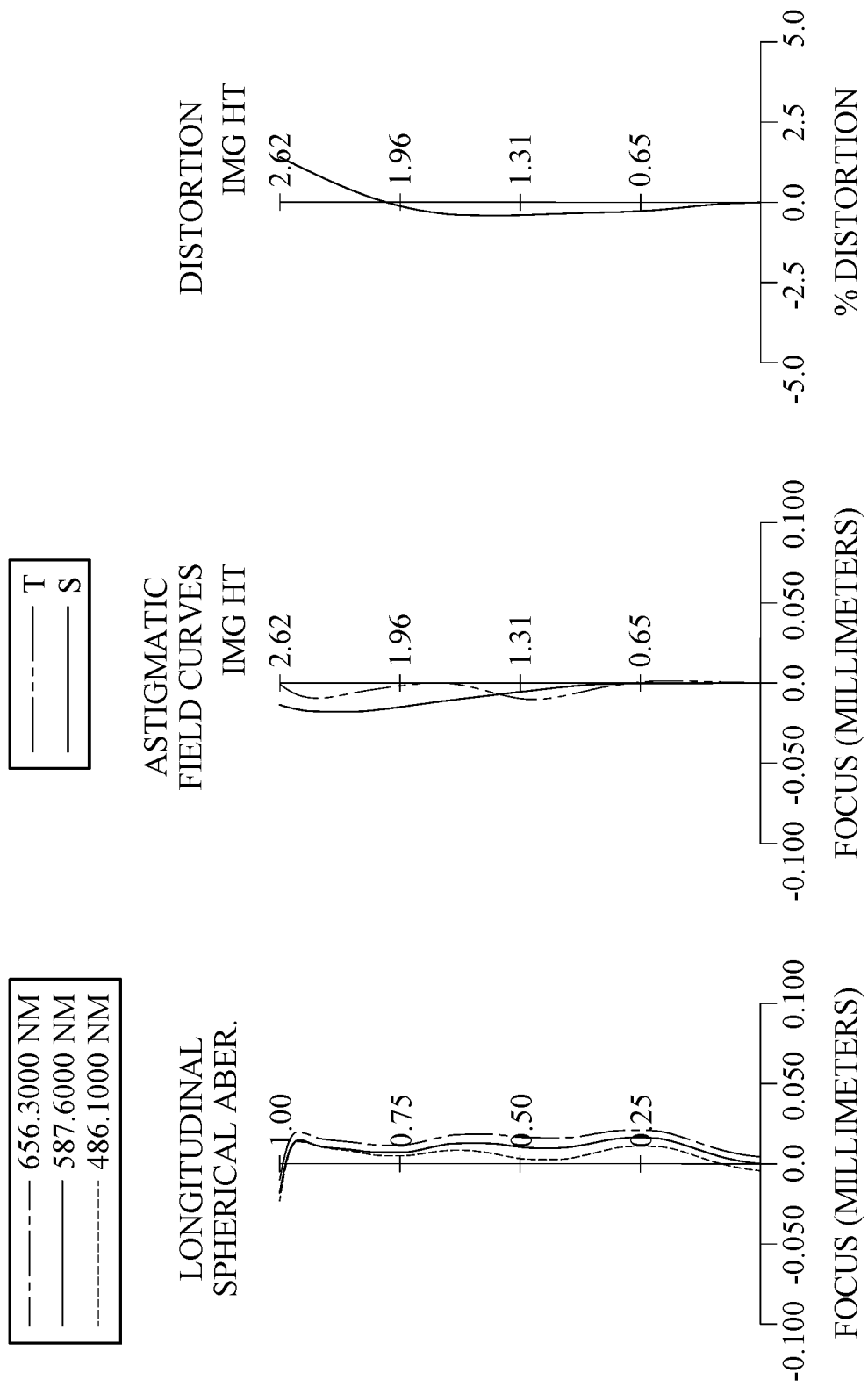
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens assembly (its reference numeral is omitted) of the present disclosure and an image sensor 280. The photographing optical lens assembly includes, in order from an object side to an image side, an aperture stop 200, a first lens element 210, a second lens element 220, a third lens element 230, a stop 201, a fourth lens element 240, a fifth lens element 250, an IR-cut filter 260 and an image surface 270. The photographing optical lens assembly includes five lens elements (210, 220, 230, 240 and 250) with no additional lens element disposed between each of the adjacent five lens elements.

The first lens element 210 with positive refractive power has an object-side surface 211 being convex in a paraxial region thereof and an image-side surface 212 being convex in a paraxial region thereof. The first lens element 220 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric. The object-side surface 221 of the second lens element 220 has at least one inflection point in an off-axis region thereof. The image-side surface 222 of the second lens element 220 has at least one concave critical point in an off-axis region thereof.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one convex critical point in an off-axis region thereof.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric.

The IR-cut filter 260 is made of glass material and located between the fifth lens element 250 and the image surface 270, and will not affect the focal length of the photographing optical lens assembly. The image sensor 280 is disposed on or near the image surface 270 of the photographing optical lens assembly.

The detailed optical data of the 2nd embodiment are shown in Table 3 and the aspheric surface data are shown in Table 4 below.

TABLE 3

2nd Embodiment
f = 6.24 mm, Fno = 2.45, HFOV = 22.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.503 | | | | |
| 2 | Lens 1 | 1.692 | (ASP) | 0.923 | Plastic | 1.534 | 55.9 | 2.08 |
| 3 | | −2.614 | (ASP) | 0.069 | | | | |
| 4 | Lens 2 | −2.058 | (ASP) | 0.529 | Plastic | 1.683 | 18.6 | 90.40 |
| 5 | | −2.200 | (ASP) | 0.051 | | | | |
| 6 | Lens 3 | −3.324 | (ASP) | 0.224 | Plastic | 1.560 | 40.0 | −2.31 |
| 7 | | 2.170 | (ASP) | 0.190 | | | | |
| 8 | Stop | Plano | | 0.154 | | | | |
| 9 | Lens 4 | 3.304 | (ASP) | 0.263 | Plastic | 1.552 | 49.0 | 41.17 |
| 10 | | 3.756 | (ASP) | 1.712 | | | | |
| 11 | Lens 5 | −6.921 | (ASP) | 0.581 | Plastic | 1.544 | 56.0 | −10.35 |
| 12 | | 31.055 | (ASP) | 0.500 | | | | |
| 13 | IR-cut Filter | Plano | | 0.210 | Glass | 1.517 | 64.2 | — |
| 14 | | Plano | | 0.407 | | | | |
| 15 | Image | Plano | | — | | | | |

Note:
Reference wavelength is 587.6 nm (d-line).
An effective radius of the stop 201 (Surface 8) is 0.910 mm.

TABLE 4

Aspheric Coefficients

| Surface # | 2 | 3 | 4 | 5 | 6 |
|---|---|---|---|---|---|
| k = | −3.0251E−01 | −1.2975E+01 | −2.6068E+00 | 1.7207E+00 | 5.9803E+00 |
| A4 = | −1.0791E−04 | 1.9213E−01 | 3.1730E−01 | 4.6131E−01 | 2.7503E−01 |
| A6 = | 1.8478E−02 | −4.1944E−01 | −6.4205E−01 | −9.8814E−01 | −4.3171E−01 |
| A8 = | −5.0027E−02 | 6.5314E−01 | 1.0490E+00 | 2.2390E+00 | 1.3773E+00 |
| A10 = | 7.0378E−02 | −6.6832E−01 | −1.1291E+00 | −3.2768E+00 | −2.6416E+00 |
| A12 = | −5.9201E−02 | 4.2679E−01 | 7.5349E−01 | 2.8568E+00 | 2.8404E+00 |
| A14 = | 2.6416E−02 | −1.5425E−01 | −2.7881E−01 | −1.3002E+00 | −1.5205E+00 |
| A16 = | −5.2784E−03 | 2.3426E−02 | 4.3198E−02 | 2.3369E−01 | 3.2752E−01 |

TABLE 4-continued

Aspheric Coefficients

| Surface # | 7 | 9 | 10 | 11 | 12 |
|---|---|---|---|---|---|
| k = | −1.8158E+01 | −7.9206E+01 | −4.2907E+01 | −9.0000E+01 | 9.0000E+01 |
| A4 = | −1.0048E−01 | −1.1502E−01 | −1.2659E−01 | −1.5520E−01 | −1.4015E−01 |
| A6 = | 5.5221E−01 | −5.8954E−01 | −2.2050E−02 | 1.2573E−01 | 1.1503E−01 |
| A8 = | −1.0497E+00 | 1.7186E+00 | 1.0338E−01 | −1.3569E−01 | −1.1589E−01 |
| A10 = | 8.1317E−01 | −3.2046E+00 | −5.5349E−02 | 1.0625E−01 | 8.2306E−02 |
| A12 = | 3.2721E−01 | 3.3637E+00 | −4.8929E−02 | −5.5363E−02 | −3.9509E−02 |
| A14 = | −1.0381E+00 | −1.8330E+00 | 1.2638E−01 | 1.8347E−02 | 1.2503E−02 |
| A16 = | 5.7613E−01 | 4.0394E−01 | −5.8884E−02 | −3.5211E−03 | −2.4961E−03 |
| A18 = | — | — | — | 3.3752E−04 | 2.8442E−04 |
| A20 = | — | — | — | 1.1176E−05 | −1.4010E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.24 | ΣAT/T45 | 1.27 |
| Fno | 2.45 | TL/f | 0.93 |
| HFOV [deg.] | 22.4 | |f1/f3| | 0.90 |
| FOV [deg.] | 44.8 | |f3/T45| | 1.35 |
| tan(FOV) | 0.99 | |f3/f2| | 0.03 |
| V/N | 11.03 | f/R3 | −3.03 |
| V4 + V5 | 105.0 | f/R8 | 1.66 |
| T45/(CT2 + CT3) | 2.27 | f/R9 | −0.90 |
| T45/Dr1r6 | 0.95 | |f/f3| − (|f/f2| + |f/f4| + |f/f5|) | 1.88 |

3rd Embodiment

Figure 5:
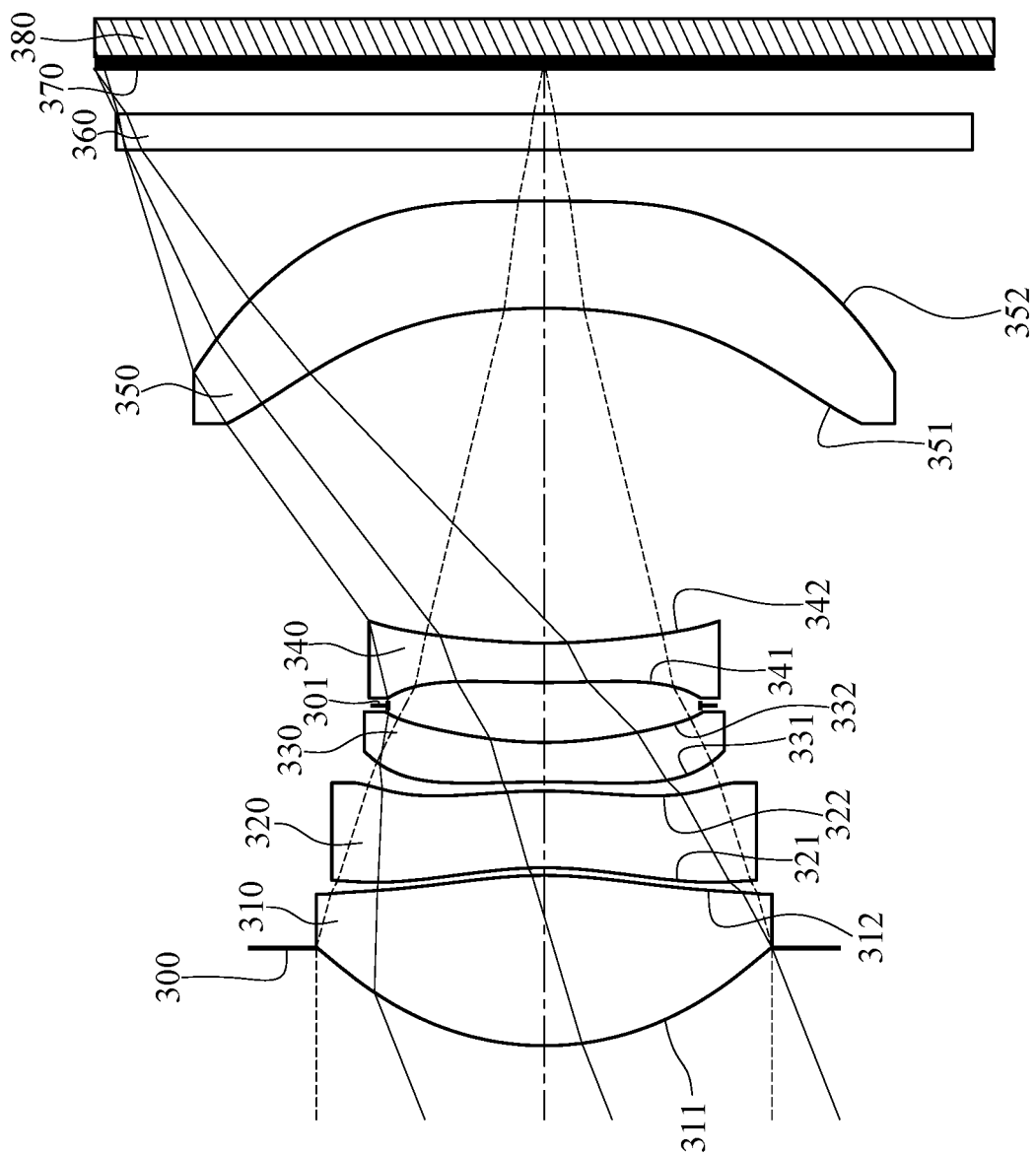
FIG. 5 is a schematic view of an image capturing unit according to the 3rd embodiment of the present disclosure.
Figure 6:
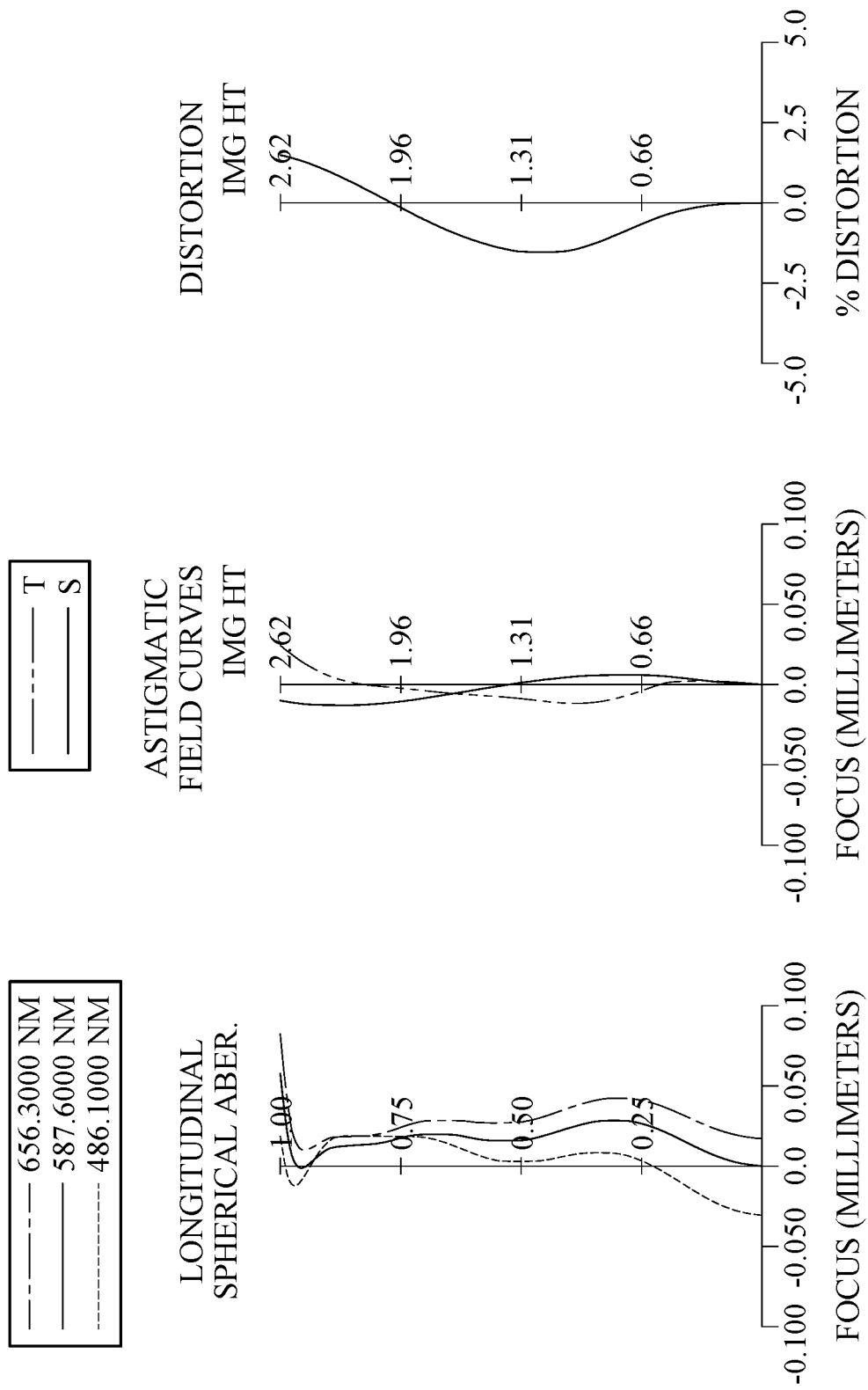
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens assembly (its reference numeral is omitted) of the present disclosure and an image sensor 380. The photographing optical lens assembly includes, in order from an object side to an image side, an aperture stop 300, a first lens element 310, a second lens element 320, a third lens element 330, a stop 301, a fourth lens element 340, a fifth lens element 350, an IR-cut filter 360 and an image surface 370. The photographing optical lens assembly includes five lens elements (310, 320, 330, 340 and 350) with no additional lens element disposed between each of the adjacent five lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has at least one inflection point in an off-axis region thereof. The image-side surface 322 of the second lens element 320 has at least one concave critical point in an off-axis region thereof.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one convex critical point in an off-axis region thereof.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The IR-cut filter 360 is made of glass material and located between the fifth lens element 350 and the image surface 370, and will not affect the focal length of the photographing optical lens assembly. The image sensor 380 is disposed on or near the image surface 370 of the photographing optical lens assembly.

The detailed optical data of the 3rd embodiment are shown in Table 5 and the aspheric surface data are shown in Table 6 below.

TABLE 5

3rd Embodiment
f = 6.51 mm, Fno = 2.45, HFOV = 21.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.570 | | | | |
| 2 | Lens 1 | 1.681 | (ASP) | 0.994 | Plastic | 1.545 | 56.1 | 2.03 |
| 3 | | −2.564 | (ASP) | 0.045 | | | | |
| 4 | Lens 2 | −2.272 | (ASP) | 0.448 | Plastic | 1.671 | 19.3 | −24.26 |
| 5 | | −2.850 | (ASP) | 0.053 | | | | |
| 6 | Lens 3 | −5.495 | (ASP) | 0.230 | Plastic | 1.544 | 56.0 | −2.83 |
| 7 | | 2.175 | (ASP) | 0.216 | | | | |
| 8 | Stop | Plano | | 0.134 | | | | |
| 9 | Lens 4 | 6.246 | (ASP) | 0.230 | Plastic | 1.544 | 56.0 | −15.29 |
| 10 | | 3.521 | (ASP) | 1.954 | | | | |
| 11 | Lens 5 | −4.025 | (ASP) | 0.625 | Plastic | 1.544 | 56.0 | −7.56 |
| 12 | | −202.925 | (ASP) | 0.300 | | | | |
| 13 | IR-cut Filter | Plano | | 0.210 | Glass | 1.517 | 64.2 | — |
| 14 | | Plano | | 0.261 | | | | |
| 15 | Image | Plano | | — | | | | |

Note:
Reference wavelength is 587.6 nm (d-line).
An effective radius of the stop 301 (Surface 8) is 0.910 mm.

TABLE 6

Aspheric Coefficients

| Surface # | 2 | 3 | 4 | 5 | 6 |
|---|---|---|---|---|---|
| k = | −2.5997E−01 | −1.3029E+01 | −2.9493E+00 | 2.4700E+00 | 9.1769E+00 |
| A4 = | −3.1946E−03 | 1.3026E−01 | 2.4020E−01 | 4.4609E−01 | 3.8388E−01 |
| A6 = | 1.0177E−02 | −1.8540E−01 | −3.0128E−01 | −8.0135E−01 | −7.8543E−01 |
| A8 = | −1.4079E−02 | 2.0752E−01 | 3.1981E−01 | 1.4103E+00 | 1.4696E+00 |
| A10 = | 8.0393E−03 | −1.3561E−01 | −1.7922E−01 | −1.4971E+00 | −1.3422E+00 |
| A12 = | −2.5438E−03 | 4.4815E−02 | 2.9081E−02 | 1.0433E+00 | 5.9212E−01 |
| A14 = | — | −6.0923E−03 | 1.4025E−02 | −4.7852E−01 | −6.0633E−02 |
| A16 = | — | — | −5.2102E−03 | 1.0141E−01 | −2.2614E−02 |

| Surface # | 7 | 9 | 10 | 11 | 12 |
|---|---|---|---|---|---|
| k = | −1.5021E+01 | −1.1310E+01 | 3.4020E+00 | −7.4331E−01 | −9.0000E+01 |
| A4 = | 6.3216E−03 | −2.7609E−01 | −1.5432E−01 | −1.2151E−01 | −1.5300E−01 |
| A6 = | 1.0386E−01 | 5.1427E−01 | 4.3799E−01 | 1.1527E−01 | 5.4946E−02 |
| A8 = | −4.6635E−01 | −2.1194E+00 | −1.3613E+00 | −9.1984E−02 | 4.7362E−03 |
| A10 = | 1.2158E+00 | 5.2778E+00 | 2.8880E+00 | 5.4320E−02 | −2.1483E−02 |
| A12 = | −1.5197E+00 | −7.5870E+00 | −3.4738E+00 | −2.2232E−02 | 1.3568E−02 |
| A14 = | 8.9438E−01 | 5.6873E+00 | 2.1951E+00 | 6.1902E−03 | −4.5693E−03 |
| A16 = | −1.3962E−01 | −1.7476E+00 | −5.6741E−01 | −1.1102E−03 | 9.0021E−04 |
| A18 = | — | — | — | 1.1471E−04 | −9.8322E−05 |
| A20 = | — | — | — | −5.1569E−06 | 4.6372E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.51 | ΣAT/T45 | 1.23 |
| Fno | 2.45 | TL/f | 0.88 |
| HFOV [deg.] | 21.6 | |f1/f3| | 0.72 |

-continued

| 3rd Embodiment | | | |
|---|---|---|---|
| FOV [deg.] | 43.2 | |f3/T45| | 1.45 |
| tan(FOV) | 0.94 | |f3/f2| | 0.12 |
| V/N | 11.55 | f/R3 | −2.86 |
| V4 + V5 | 112.0 | f/R8 | 1.85 |
| T45/(CT2 + CT3) | 2.88 | f/R9 | −1.62 |
| T45/Dr1r6 | 1.10 | |f/f3| − (|f/f2| + |f/f4| + |f/f5|) | 0.74 |

4th Embodiment

Figure 7:
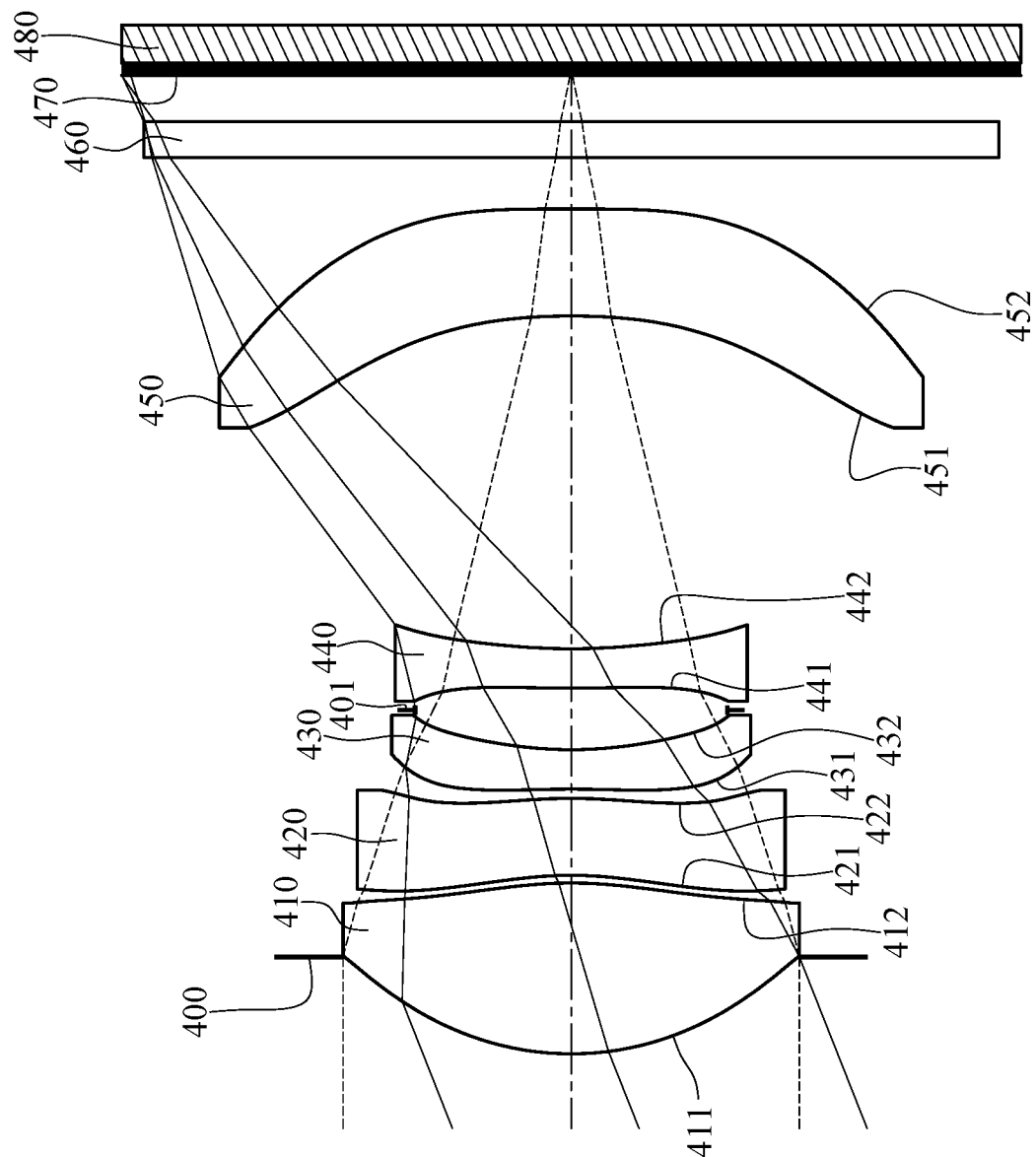
FIG. 7 is a schematic view of an image capturing unit according to the 4th embodiment of the present disclosure.
Figure 8:
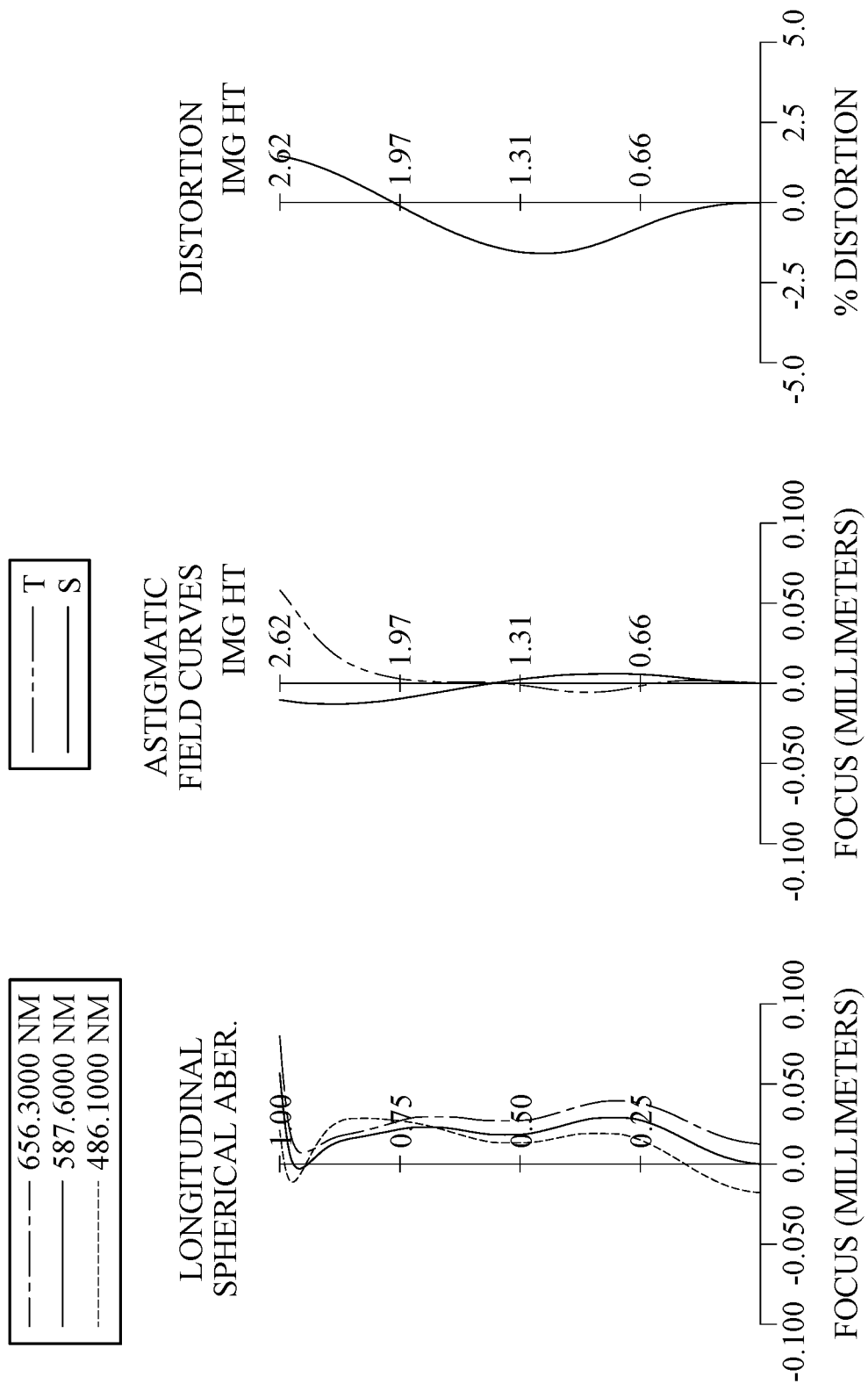
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens assembly (its reference numeral is omitted) of the present disclosure and an image sensor 480. The photographing optical lens assembly includes, in order from an object side to an image side, an aperture stop 400, a first lens element 410, a second lens element 420, a third lens element 430, a stop 401, a fourth lens element 440, a fifth lens element 450, an IR-cut filter 460 and an image surface 470. The photographing optical lens assembly includes five lens elements (410, 420, 430, 440 and 450) with no additional lens element disposed between each of the adjacent five lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has at least one inflection point in an off-axis region thereof. The image-side surface 422 of the second lens element 420 has at least one concave critical point in an off-axis region thereof.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one convex critical point in an off-axis region thereof.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The IR-cut filter 460 is made of glass material and located between the fifth lens element 450 and the image surface 470, and will not affect the focal length of the photographing optical lens assembly. The image sensor 480 is disposed on or near the image surface 470 of the photographing optical lens assembly.

The detailed optical data of the 4th embodiment are shown in Table 7 and the aspheric surface data are shown in Table 8 below.

TABLE 7

4th Embodiment
f = 6.51 mm, Fno = 2.45, HFOV = 21.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.565 | | | | |
| 2 | Lens 1 | 1.692 | (ASP) | 0.997 | Plastic | 1.545 | 56.1 | 2.00 |
| 3 | | −2.409 | (ASP) | 0.045 | | | | |
| 4 | Lens 2 | −2.158 | (ASP) | 0.449 | Plastic | 1.671 | 19.3 | −15.84 |
| 5 | | −2.935 | (ASP) | 0.054 | | | | |
| 6 | Lens 3 | −6.027 | (ASP) | 0.230 | Plastic | 1.544 | 56.0 | −3.01 |
| 7 | | 2.278 | (ASP) | 0.231 | | | | |
| 8 | Stop | Plano | | 0.128 | | | | |
| 9 | Lens 4 | 7.272 | (ASP) | 0.230 | Plastic | 1.544 | 56.0 | −13.27 |
| 10 | | 3.582 | (ASP) | 1.942 | | | | |
| 11 | Lens 5 | −3.907 | (ASP) | 0.625 | Plastic | 1.544 | 56.0 | −7.66 |
| 12 | | −65.561 | (ASP) | 0.300 | | | | |
| 13 | IR-cut Filter | Plano | | 0.210 | Glass | 1.517 | 64.2 | — |
| 14 | | Plano | | 0.269 | | | | |
| 15 | Image | Plano | | — | | | | |

Note:
Reference wavelength is 587.6 nm (d-line).
An effective radius of the stop 401 (Surface 8) is 0.910 mm.

TABLE 8

Aspheric Coefficients

| Surface # | 2 | 3 | 4 | 5 | 6 |
|---|---|---|---|---|---|
| k = | −2.5397E−01 | −1.3782E+01 | −3.2006E+00 | 2.9085E+00 | 2.2071E+00 |
| A4 = | −3.1098E−03 | 1.0042E−01 | 2.2020E−01 | 3.8245E−01 | 3.2620E−01 |
| A6 = | 8.6588E−03 | −7.0384E−02 | −1.8182E−01 | −4.0740E−01 | −2.9986E−01 |
| A8 = | −1.2733E−02 | 1.6577E−02 | 7.9048E−02 | 2.8483E−01 | −2.0387E−01 |
| A10 = | 7.8794E−03 | 2.1957E−02 | 4.3427E−02 | 1.4715E−01 | 1.6049E+00 |

TABLE 8-continued

| Aspheric Coefficients | | | | | |
|---|---|---|---|---|---|
| A12 = | −2.6483E−03 | −1.9393E−02 | −6.9699E−02 | −2.4810E−01 | −2.2258E+00 |
| A14 = | — | 4.2901E−03 | 3.1198E−02 | 4.4591E−02 | 1.3674E+00 |
| A16 = | — | — | −5.1358E−03 | 1.5636E−02 | −3.2868E−01 |

| Surface # | 7 | 9 | 10 | 11 | 12 |
|---|---|---|---|---|---|
| k= | −1.2905E+01 | 4.2840E+01 | 5.1362E+00 | 1.6933E+00 | 9.0000E+01 |
| A4 = | −5.3824E−03 | −2.7637E−01 | −1.4526E−01 | −1.1609E−01 | −1.6282E−01 |
| A6 = | 2.2253E−01 | 5.4190E−01 | 4.6392E−01 | 1.1900E−01 | 8.3104E−02 |
| A8 = | −9.0474E−01 | −2.1929E+00 | −1.4633E+00 | −9.9606E−02 | −3.3080E−02 |
| A10 = | 2.1862E+00 | 5.3168E+00 | 3.1185E+00 | 6.2505E−02 | 8.2848E−03 |
| A12 = | −2.5588E+00 | −7.3140E+00 | −3.7617E+00 | −2.6497E−02 | −1.1574E−03 |
| A14 = | 1.4528E+00 | 5.2038E+00 | 2.3559E+00 | 7.4312E−03 | 1.1413E−04 |
| A16 = | −2.4476E−01 | −1.5176E+00 | −5.9872E−01 | −1.3118E−03 | −3.0959E−05 |
| A18 = | — | — | — | 1.3108E−04 | 6.9775E−06 |
| A20 = | — | — | — | −5.6252E−06 | −5.1770E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.51 | ΣAT/T45 | 1.24 |
| Fno | 2.45 | TL/f | 0.88 |
| HFOV [deg.] | 21.5 | |f1/f3| | 0.66 |
| FOV [deg.] | 43.0 | |f3/T45| | 1.55 |
| tan(FOV) | 0.93 | |f3/f2| | 0.19 |
| V/N | 11.55 | f/R3 | −3.02 |
| V4 + V5 | 112.0 | f/R8 | 1.82 |
| T45/(CT2 + CT3) | 2.86 | f/R9 | −1.67 |
| T45/Dr1r6 | 1.09 | |f/f3| − (|f/f2| + |f/f4| + |f/f5|) | 0.41 |

5th Embodiment

Figure 9:
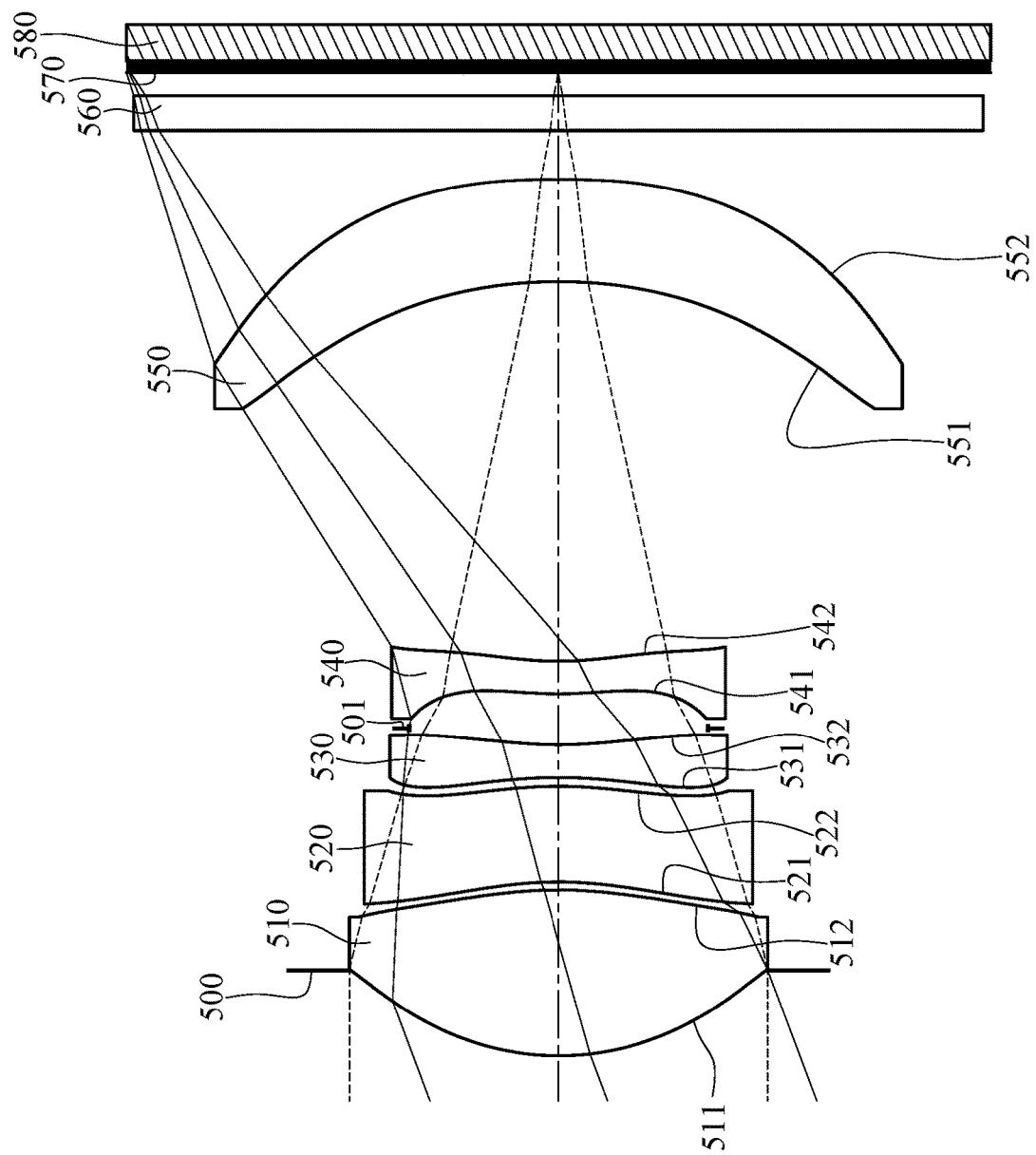
FIG. 9 is a schematic view of an image capturing unit according to the 5th embodiment of the present disclosure.
Figure 10:
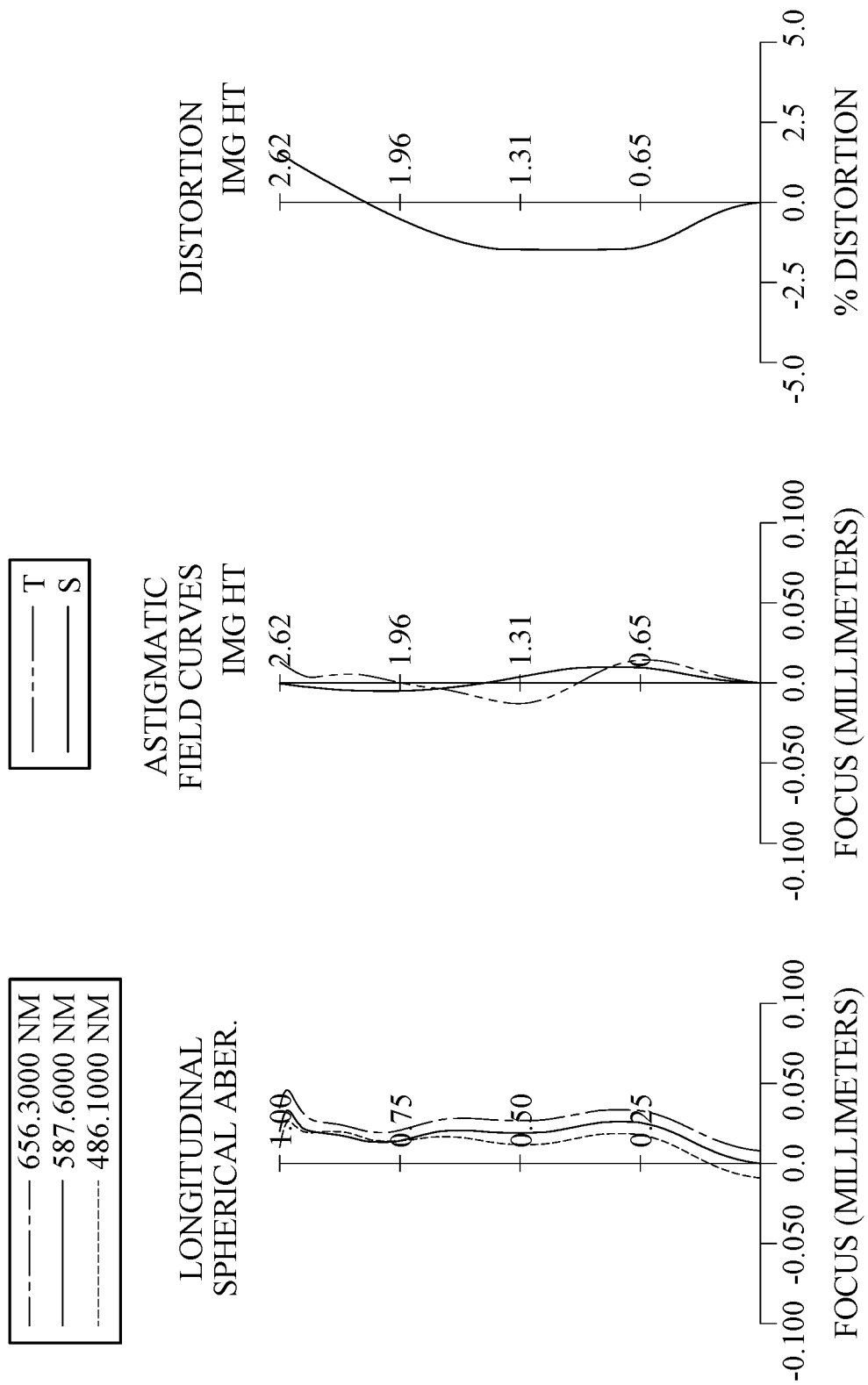
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens assembly (its reference numeral is omitted) of the present disclosure and an image sensor 580. The photographing optical lens assembly includes, in order from an object side to an image side, an aperture stop 500, a first lens element 510, a second lens element 520, a third lens element 530, a stop 501, a fourth lens element 540, a fifth lens element 550, an IR-cut filter 560 and an image surface 570. The photographing optical lens assembly includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric. The object-side surface 521 of the second lens element 520 has at least one inflection point in an off-axis region thereof. The image-side surface 522 of the second lens element 520 has at least one concave critical point in an off-axis region thereof.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has at least one convex critical point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The IR-cut filter 560 is made of glass material and located between the fifth lens element 550 and the image surface 570, and will not affect the focal length of the photographing optical lens assembly. The image sensor 580 is disposed on or near the image surface 570 of the photographing optical lens assembly.

The detailed optical data of the 5th embodiment are shown in Table 9 and the aspheric surface data are shown in Table 10 below.

TABLE 9

5th Embodiment
f = 6.88 mm, Fno = 2.70, HFOV = 20.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.525 | | | | |
| 2 | Lens 1 | 1.653 | (ASP) | 1.014 | Plastic | 1.534 | 55.9 | 2.02 |
| 3 | | −2.430 | (ASP) | 0.049 | | | | |
| 4 | Lens 2 | −2.111 | (ASP) | 0.582 | Plastic | 1.671 | 19.3 | −222.92 |
| 5 | | −2.378 | (ASP) | 0.054 | | | | |
| 6 | Lens 3 | −2.829 | (ASP) | 0.200 | Plastic | 1.555 | 45.2 | −2.32 |
| 7 | | 2.420 | (ASP) | 0.102 | | | | |
| 8 | Stop | Plano | | 0.210 | | | | |
| 9 | Lens 4 | 2.489 | (ASP) | 0.200 | Plastic | 1.544 | 56.0 | −29.11 |
| 10 | | 2.090 | (ASP) | 2.313 | | | | |
| 11 | Lens 5 | −3.115 | (ASP) | 0.626 | Plastic | 1.544 | 56.0 | −10.59 |
| 12 | | −7.260 | (ASP) | 0.300 | | | | |
| 13 | IR-cut Filter | Plano | | 0.210 | Glass | 1.517 | 64.2 | — |
| 14 | | Plano | | 0.141 | | | | |
| 15 | Image | Plano | | — | | | | |

Note:
Reference wavelength is 587.6 nm (d-line).
An effective radius of the stop 501 (Surface 8) is 0.910 mm.

TABLE 10

Aspheric Coefficients

| Surface # | 2 | 3 | 4 | 5 | 6 |
|---|---|---|---|---|---|
| k = | −3.1237E−01 | −9.3145E+00 | −1.9318E+00 | 2.4745E+00 | 4.3119E+00 |
| A4 = | 7.8795E−04 | 1.6224E−01 | 2.6946E−01 | 4.4569E−01 | 2.1566E−01 |
| A6 = | 1.0928E−02 | −4.1044E−01 | −5.3959E−01 | −1.0990E+00 | −5.7117E−01 |
| A8 = | −2.4341E−02 | 6.8126E−01 | 8.8886E−01 | 2.5266E+00 | 1.9135E+00 |
| A10 = | 2.4415E−02 | −6.6467E−01 | −8.8329E−01 | −3.3733E+00 | −3.1538E+00 |
| A12 = | −1.4053E−02 | 3.5886E−01 | 4.9024E−01 | 2.6153E+00 | 2.9315E+00 |
| A14 = | 3.3155E−03 | −9.7094E−02 | −1.3396E−01 | −1.1014E+00 | −1.4824E+00 |
| A16 = | −4.4638E−04 | 9.5520E−03 | 1.2455E−02 | 2.0593E−01 | 3.4829E−01 |

| Surface # | 7 | 9 | 10 | 11 | 12 |
|---|---|---|---|---|---|
| k = | −3.9409E+01 | −6.7604E+01 | −2.8386E+01 | −1.2827E+01 | −6.5608E+01 |
| A4 = | −1.3205E−01 | −9.0833E−02 | 2.4297E−02 | −1.3738E−01 | −2.2655E−01 |
| A6 = | 2.8075E−01 | −1.4135E+00 | −7.0081E−01 | 1.9442E−01 | 2.9188E−01 |
| A8 = | −2.6649E−01 | 4.5364E+00 | 1.9131E+00 | −2.2968E−01 | −2.7649E−01 |
| A10 = | −1.7721E−01 | −9.0714E+00 | −2.9081E+00 | 1.7356E−01 | 1.6632E−01 |
| A12 = | 5.3510E−01 | 1.0955E+01 | 2.7737E+00 | −8.3729E−02 | −6.4706E−02 |
| A14 = | −4.1897E−01 | −7.4101E+00 | −1.4857E+00 | 2.5920E−02 | 1.6307E−02 |
| A16 = | 1.2482E−01 | 2.1105E+00 | 3.3777E−01 | −5.0099E−03 | −2.5751E−03 |
| A18 = | — | — | — | 5.5321E−04 | 2.3120E−04 |
| A20 = | — | — | — | −2.6719E−05 | −8.9577E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 6.88 | ΣAT/T45 | 1.18 |
|---|---|---|---|
| Fno | 2.70 | TL/f | 0.87 |
| HFOV [deg.] | 20.5 | |f1/f3| | 0.87 |

-continued

5th Embodiment

| FOV [deg.] | 41.0 | |f3/T45| | 1.00 |
|---|---|---|---|
| tan(FOV) | 0.87 | |f3/f2| | 0.01 |
| V/N | 11.55 | f/R3 | −3.26 |
| V4 + V5 | 112.0 | f/R8 | 3.29 |
| T45/(CT2 + CT3) | 2.96 | f/R9 | −2.21 |
| T45/Dr1r6 | 1.22 | |f/f3| − (|f/f2| + |f/f4| + |f/f5|) | 2.05 |

6th Embodiment

Figure 11:
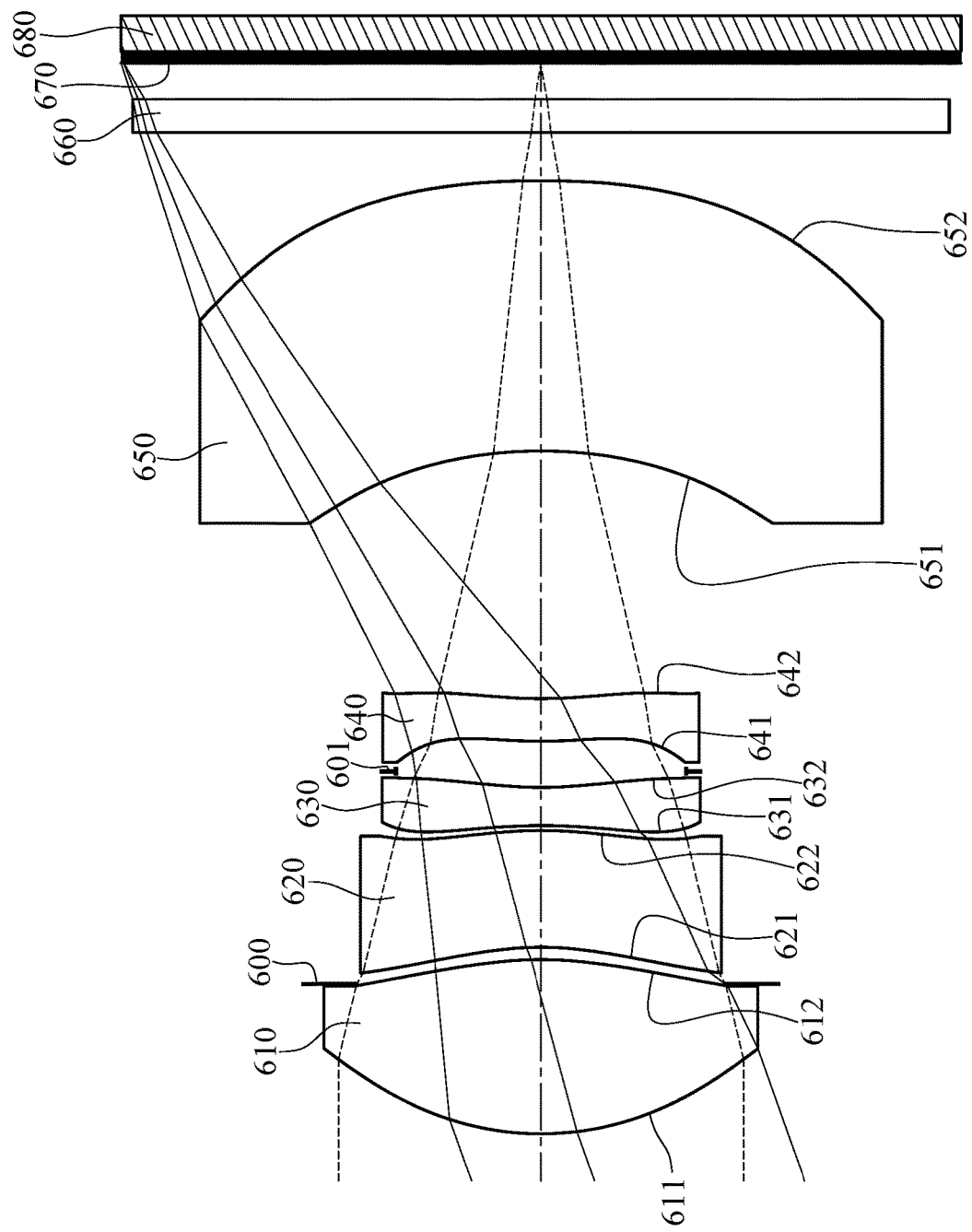
FIG. 11 is a schematic view of an image capturing unit according to the 6th embodiment of the present disclosure.
Figure 12:
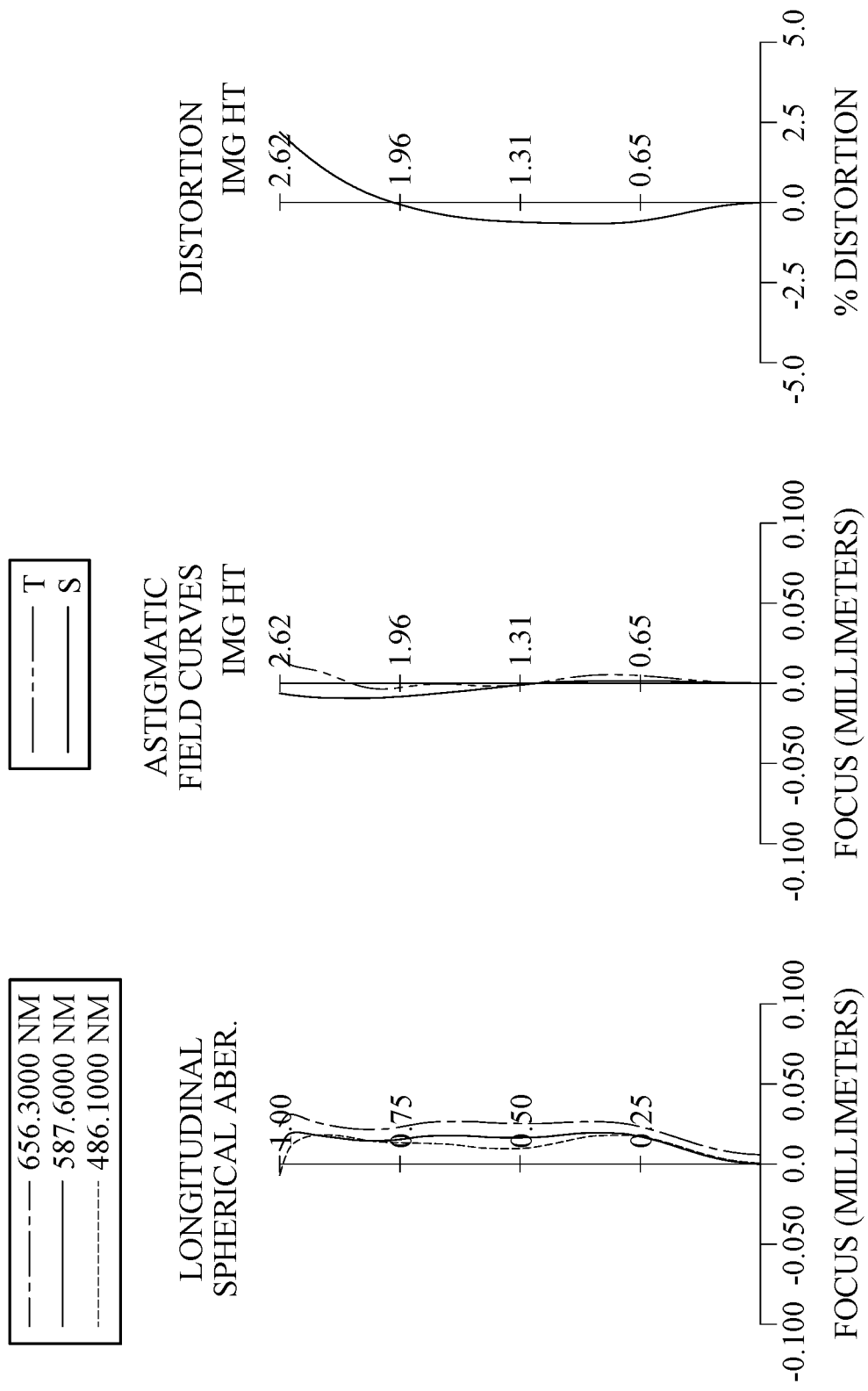
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens assembly (its reference numeral is omitted) of the present disclosure and an image sensor 680. The photographing optical lens assembly includes, in order from an object side to an image side, a first lens element 610, an aperture stop 600, a second lens element 620, a third lens element 630, a stop 601, a fourth lens element 640, a fifth lens element 650, an IR-cut filter 660 and an image surface 670. The photographing optical lens assembly includes five lens elements (610, 620, 630, 640 and 650) with no additional lens element disposed between each of the adjacent five lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric. The object-side surface 621 of the second lens element 620 has at least one inflection point in an off-axis region thereof. The image-side surface 622 of the second lens element 620 has at least one concave critical point in an off-axis region thereof.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one convex critical point in an off-axis region thereof.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The IR-cut filter 660 is made of glass material and located between the fifth lens element 650 and the image surface 670, and will not affect the focal length of the photographing optical lens assembly. The image sensor 680 is disposed on or near the image surface 670 of the photographing optical lens assembly.

The detailed optical data of the 6th embodiment are shown in Table 11 and the aspheric surface data are shown in Table 12 below.

TABLE 11

6th Embodiment
f = 7.24 mm, Fno = 2.85, HFOV = 19.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.847 | (ASP) | 1.092 | Plastic | 1.534 | 55.9 | 2.09 |
| 2 | | −2.227 | (ASP) | −0.154 | | | | |
| 3 | Ape. Stop | Plano | | 0.231 | | | | |
| 4 | Lens 2 | −1.911 | (ASP) | 0.736 | Plastic | 1.640 | 22.6 | −45.74 |
| 5 | | −2.352 | (ASP) | 0.030 | | | | |
| 6 | Lens 3 | −3.417 | (ASP) | 0.239 | Plastic | 1.551 | 43.6 | −2.55 |
| 7 | | 2.447 | (ASP) | 0.100 | | | | |
| 8 | Stop | Plano | | 0.188 | | | | |
| 9 | Lens 4 | 2.993 | (ASP) | 0.268 | Plastic | 1.544 | 53.0 | 250.23 |
| 10 | | 2.964 | (ASP) | 1.555 | | | | |
| 11 | Lens 5 | −2.850 | (ASP) | 1.698 | Plastic | 1.539 | 56.0 | −13.23 |
| 12 | | −5.736 | (ASP) | 0.300 | | | | |
| 13 | IR-cut Filter | Plano | | 0.210 | Glass | 1.517 | 64.2 | — |
| 14 | | Plano | | 0.231 | | | | |
| 15 | Image | Plano | | — | | | | |

Note:
Reference wavelength is 587.6 nm (d-line).
An effective radius of the stop 601 (Surface 8) is 0.910 mm.
An effective radius of the object-side surface 651 (Surface 11) is 1.450 mm.

TABLE 12

Aspheric Coefficients

| Surface # | 1 | 2 | 4 | 5 | 6 |
|---|---|---|---|---|---|
| k = | −2.4292E−01 | −8.9102E+00 | −1.8823E+00 | 2.0547E+00 | 4.6698E+00 |
| A4 = | −8.0557E−04 | 1.6031E−01 | 2.9751E−01 | 5.1366E−01 | 2.7311E−01 |
| A6 = | 4.6094E−03 | −4.0384E−01 | −6.3532E−01 | −1.7670E+00 | −1.2253E+00 |
| A8 = | −1.4331E−02 | 6.5521E−01 | 1.0845E+00 | 5.1719E+00 | 4.6056E+00 |

TABLE 12-continued

| Aspheric Coefficients | | | | | |
|---|---|---|---|---|---|
| A10 = | 1.3885E−02 | −6.6603E−01 | −1.2009E+00 | −8.8939E+00 | −8.9145E+00 |
| A12 = | −7.3799E−03 | 4.1088E−01 | 8.1725E−01 | 9.9888E+00 | 9.6814E+00 |
| A14 = | 1.2243E−03 | −1.4063E−01 | −3.0938E−01 | −4.8900E+00 | −5.5076E+00 |
| A16 = | 8.4151E−05 | 2.0575E−02 | 4.9708E−02 | 1.0931E+00 | 1.2810E+00 |

| Surface # | 7 | 9 | 10 | 11 | 12 |
|---|---|---|---|---|---|
| k = | −3.8159E+01 | −4.9104E+01 | −3.7363E+01 | −5.9949E+00 | −5.9619E−01 |
| A4 = | −1.2049E−01 | −2.3046E−01 | −5.8677E−02 | −5.8643E−02 | −6.0658E−02 |
| A6 = | 2.3923E−01 | −2.1819E−01 | −2.2171E−01 | 4.9969E−02 | 5.0858E−02 |
| A8 = | −1.2245E−01 | 2.0174E−01 | 4.1687E−01 | −8.0554E−02 | −3.8289E−02 |
| A10 = | −8.1054E−01 | 1.1131E−01 | −4.5867E−01 | 8.9935E−02 | 1.7917E−02 |
| A12 = | 1.7331E+00 | −1.1358E+00 | 4.1403E−01 | −7.0215E−02 | −5.1153E−03 |
| A14 = | −1.4550E+00 | 1.7162E+00 | −1.8073E−01 | 3.8135E−02 | 8.2984E−04 |
| A16 = | 5.0951E−01 | −7.6201E−01 | 2.0554E−02 | −1.3818E−02 | −5.9200E−05 |
| A18 = | — | — | — | 3.0727E−03 | −1.0129E−06 |
| A20 = | — | — | — | −3.1703E−04 | 2.8317E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 7.24 | ΣAT/T45 | 1.25 |
| Fno | 2.85 | TL/f | 0.93 |
| HFOV [deg.] | 19.4 | |f1/f3| | 0.82 |
| FOV [deg.] | 38.8 | |f3/T45| | 1.64 |
| tan(FOV) | 0.80 | |f3/f2| | 0.06 |
| V/N | 13.79 | f/R3 | −3.79 |
| V4 + V5 | 109.0 | f/R8 | 2.44 |
| T45/(CT2 + CT3) | 1.59 | f/R9 | −2.54 |
| T45/Dr1r6 | 0.72 | |f/f3| − (|f/f2| + |f/f4| + |f/f5|) | 2.10 |

7th Embodiment

Figure 13:
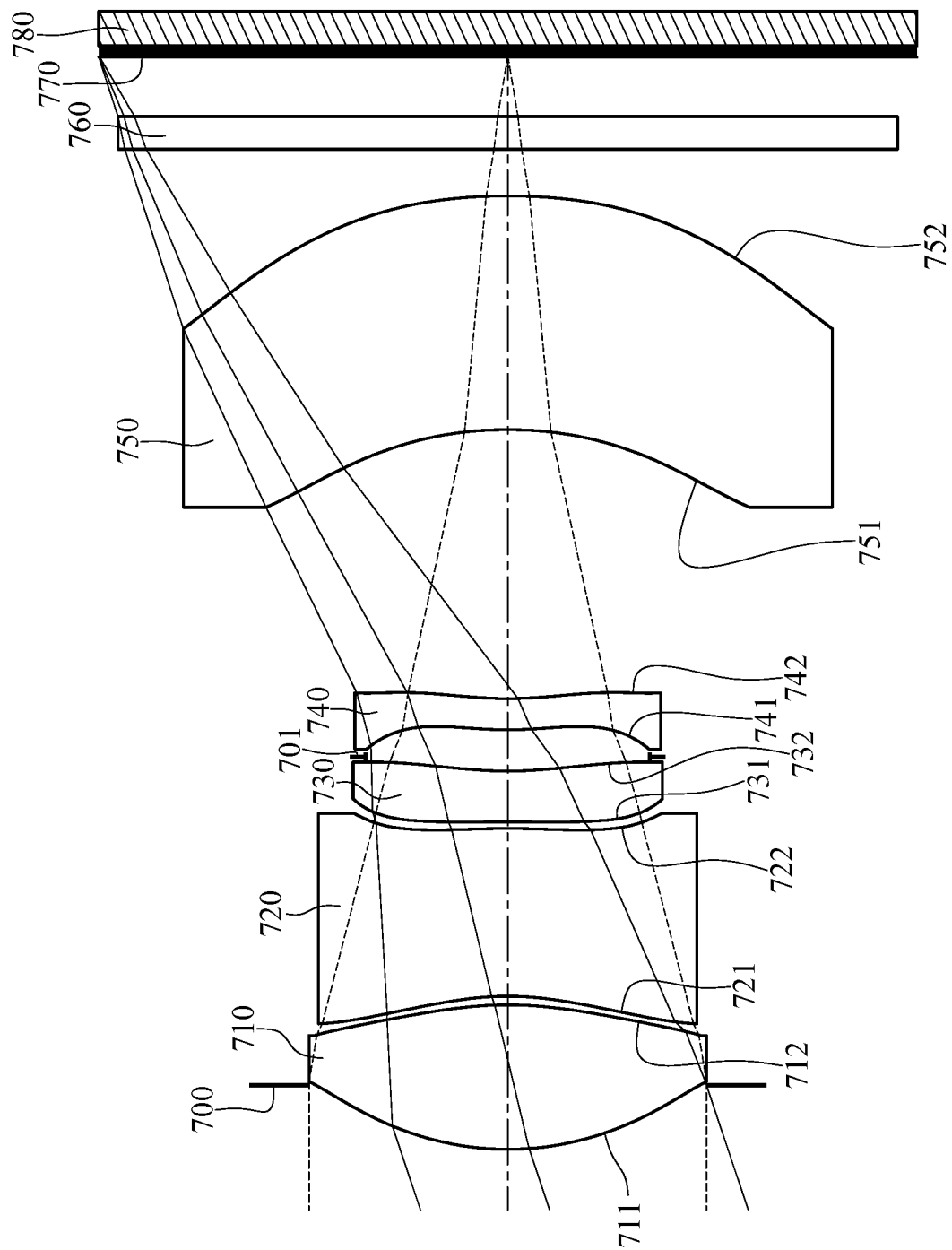
FIG. 13 is a schematic view of an image capturing unit according to the 7th embodiment of the present disclosure.
Figure 14:
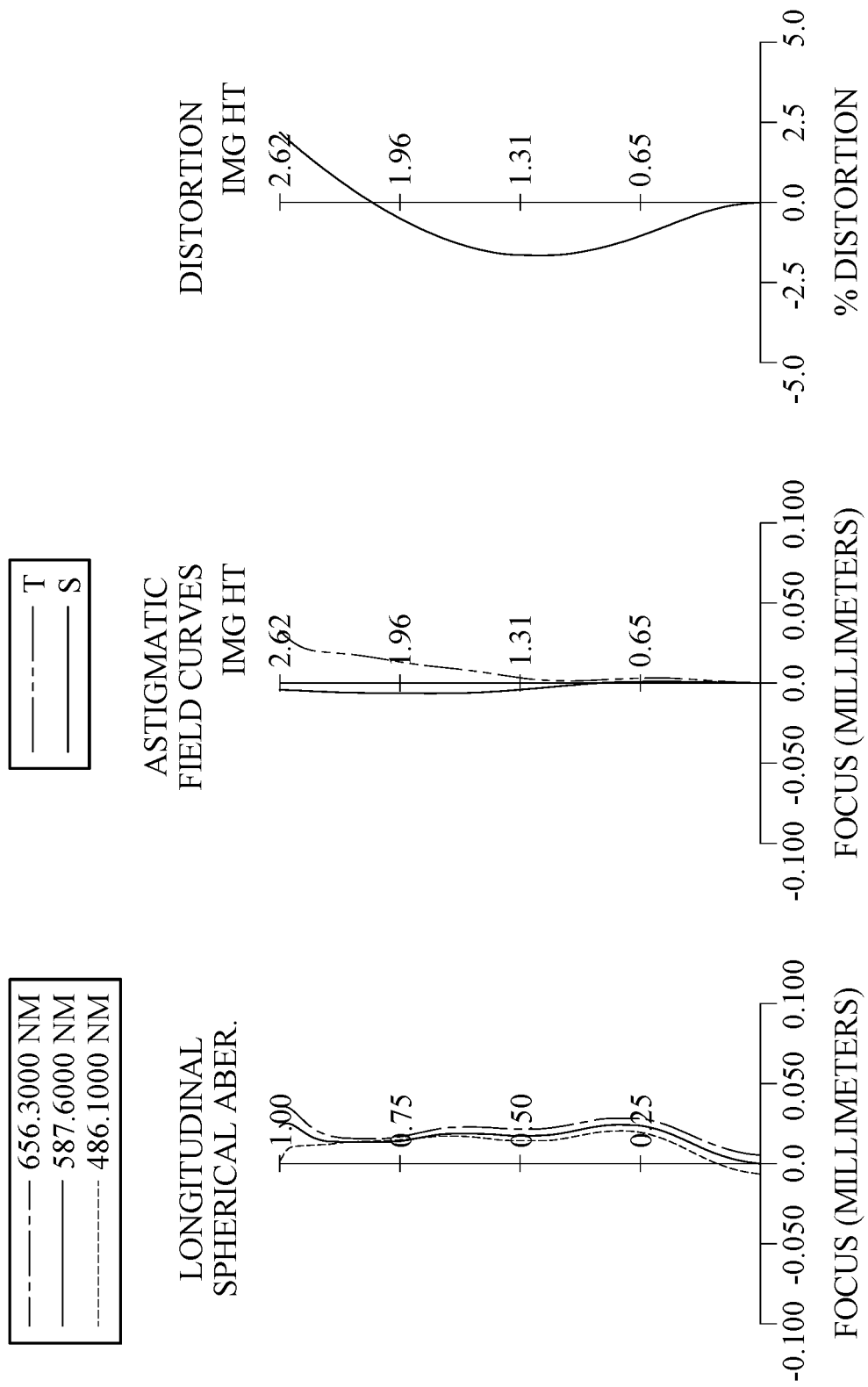
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens assembly (its reference numeral is omitted) of the present disclosure and an image sensor 780. The photographing optical lens assembly includes, in order from an object side to an image side, an aperture stop 700, a first lens element 710, a second lens element 720, a third lens element 730, a stop 701, a fourth lens element 740, a fifth lens element 750, an IR-cut filter 760 and an image surface 770. The photographing optical lens assembly includes five lens elements (710, 720, 730, 740 and 750) with no additional lens element disposed between each of the adjacent five lens elements.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric. The object-side surface 721 of the second lens element 720 has at least one inflection point in an off-axis region thereof. The image-side surface 722 of the second lens element 720 has at least one concave critical point in an off-axis region thereof.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has at least one convex critical point in an off-axis region thereof.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The IR-cut filter 760 is made of glass material and located between the fifth lens element 750 and the image surface 770, and will not affect the focal length of the photographing optical lens assembly. The image sensor 780 is disposed on or near the image surface 770 of the photographing optical lens assembly.

The detailed optical data of the 7th embodiment are shown in Table 13 and the aspheric surface data are shown in Table 14 below.

TABLE 13

7th Embodiment
f = 7.64 mm, Fno = 3.00, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.411 | | | | |
| 2 | Lens 1 | 1.881 | (ASP) | 0.927 | Plastic | 1.534 | 55.9 | 2.07 |
| 3 | | −2.208 | (ASP) | 0.055 | | | | |
| 4 | Lens 2 | −1.811 | (ASP) | 1.076 | Plastic | 1.582 | 30.2 | −6.11 |
| 5 | | −4.498 | (ASP) | 0.043 | | | | |
| 6 | Lens 3 | −14.504 | (ASP) | 0.325 | Plastic | 1.544 | 56.0 | −3.75 |
| 7 | | 2.393 | (ASP) | 0.092 | | | | |
| 8 | Stop | Plano | | 0.173 | | | | |
| 9 | Lens 4 | 2.416 | (ASP) | 0.200 | Plastic | 1.544 | 56.0 | 121.47 |
| 10 | | 2.434 | (ASP) | 1.725 | | | | |
| 11 | Lens 5 | −2.476 | (ASP) | 1.499 | Plastic | 1.582 | 30.2 | −22.45 |
| 12 | | −3.734 | (ASP) | 0.300 | | | | |
| 13 | IR-cut Filter | Plano | | 0.210 | Glass | 1.517 | 64.2 | — |
| 14 | | Plano | | 0.380 | | | | |
| 15 | Image | Plano | | — | | | | |

Note:
Reference wavelength is 587.6 nm (d-line).
An effective radius of the stop 701 (Surface 8) is 0.910 mm.
An effective radius of the object-side surface 751 (Surface 11) is 1.550 mm.

TABLE 14

Aspheric Coefficients

| Surface # | 2 | 3 | 4 | 5 | 6 |
|---|---|---|---|---|---|
| k = | −2.6703E−01 | −8.2051E+00 | −1.9790E+00 | 2.9909E−01 | 2.7437E+01 |
| A4 = | −1.8397E−03 | 1.2524E−01 | 2.5127E−01 | 4.7469E−01 | 2.9098E−01 |
| A6 = | 8.9577E−03 | −2.3512E−01 | −3.8323E−01 | −1.3402E+00 | −1.0749E+00 |
| A8 = | −2.9170E−02 | 3.0711E−01 | 4.9791E−01 | 3.6125E+00 | 3.5393E+00 |
| A10 = | 3.8796E−02 | −2.8076E−01 | −4.5835E−01 | −6.2619E+00 | −6.7277E+00 |
| A12 = | −3.1809E−02 | 1.6807E−01 | 2.7903E−01 | 6.7662E+00 | 7.7131E+00 |
| A14 = | 1.3124E−02 | −5.7763E−02 | −9.6939E−02 | −3.9887E+00 | −4.7814E+00 |
| A16 = | −2.4234E−03 | 8.2464E−03 | 1.4227E−02 | 9.5442E−01 | 1.2310E+00 |

| Surface # | 7 | 9 | 10 | 11 | 12 |
|---|---|---|---|---|---|
| k = | −3.7909E+01 | −4.7936E+01 | −4.1452E+01 | −5.7475E+00 | −5.9619E−01 |
| A4 = | −6.2142E−02 | −1.8819E−01 | −2.0788E−02 | −8.0997E−02 | −6.1145E−02 |
| A6 = | −1.6845E−01 | −8.1138E−01 | −6.6620E−01 | 6.9136E−02 | 4.7068E−02 |
| A8 = | 1.1291E+00 | 2.6547E+00 | 2.0391E+00 | −8.7642E−02 | −3.4494E−02 |
| A10 = | −2.9455E+00 | −4.8899E+00 | −3.4746E+00 | 9.6219E−02 | 1.9086E−02 |
| A12 = | 3.8953E+00 | 4.8880E+00 | 3.5787E+00 | −7.1315E−02 | −7.2901E−03 |
| A14 = | −2.7140E+00 | −2.4724E+00 | −1.9703E+00 | 3.4939E−02 | 1.8568E−03 |
| A16 = | 8.2262E−01 | 5.0028E−01 | 4.4506E−01 | −1.0757E−02 | −2.9975E−04 |
| A18 = | — | — | — | 1.8797E−03 | 2.7714E−05 |
| A20 = | — | — | — | −1.4229E−04 | −1.1152E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 7.64 | ΣAT/T45 | 1.21 |
| Fno | 3.00 | TL/f | 0.92 |

-continued

| 7th Embodiment | | | |
|---|---|---|---|
| HFOV [deg.] | 18.5 | |f1/f3| | 0.55 |
| FOV [deg.] | 37.0 | |f3/T45| | 2.17 |
| tan(FOV) | 0.75 | |f3/f2| | 0.61 |
| V/N | 19.11 | f/R3 | −4.22 |
| V4 + V5 | 86.2 | f/R8 | 3.14 |
| T45/(CT2 + CT3) | 1.23 | f/R9 | −3.09 |
| T45/Dr1r6 | 0.71 | |f/f3| − (|f/f2| + |f/f4| + |f/f5|) | 0.38 |

8th Embodiment

Figure 15:
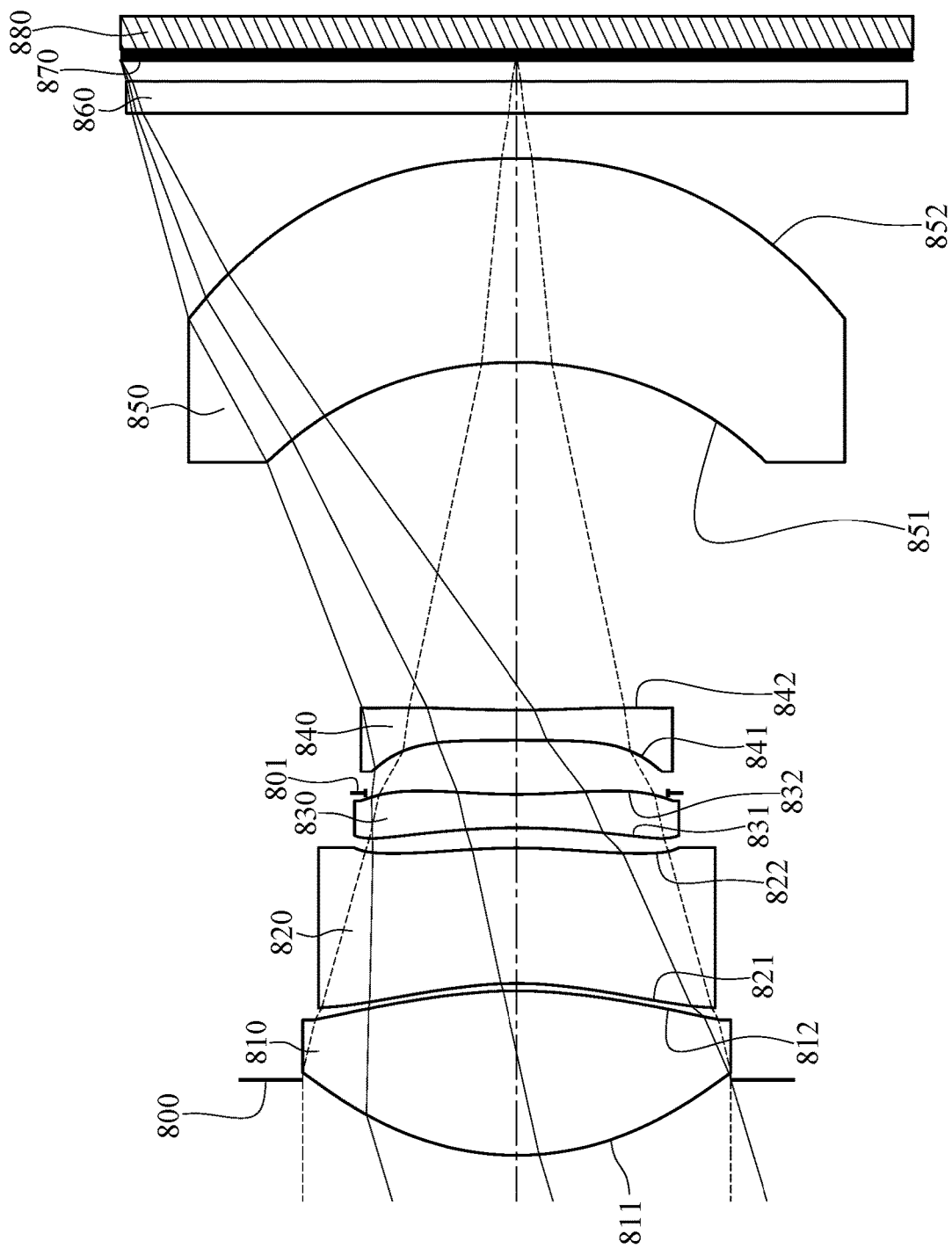
FIG. 15 is a schematic view of an image capturing unit according to the 8th embodiment of the present disclosure.

FIG. 15 is a schematic view of an image capturing unit according to the 8th embodiment of the present disclosure.

Figure 16:
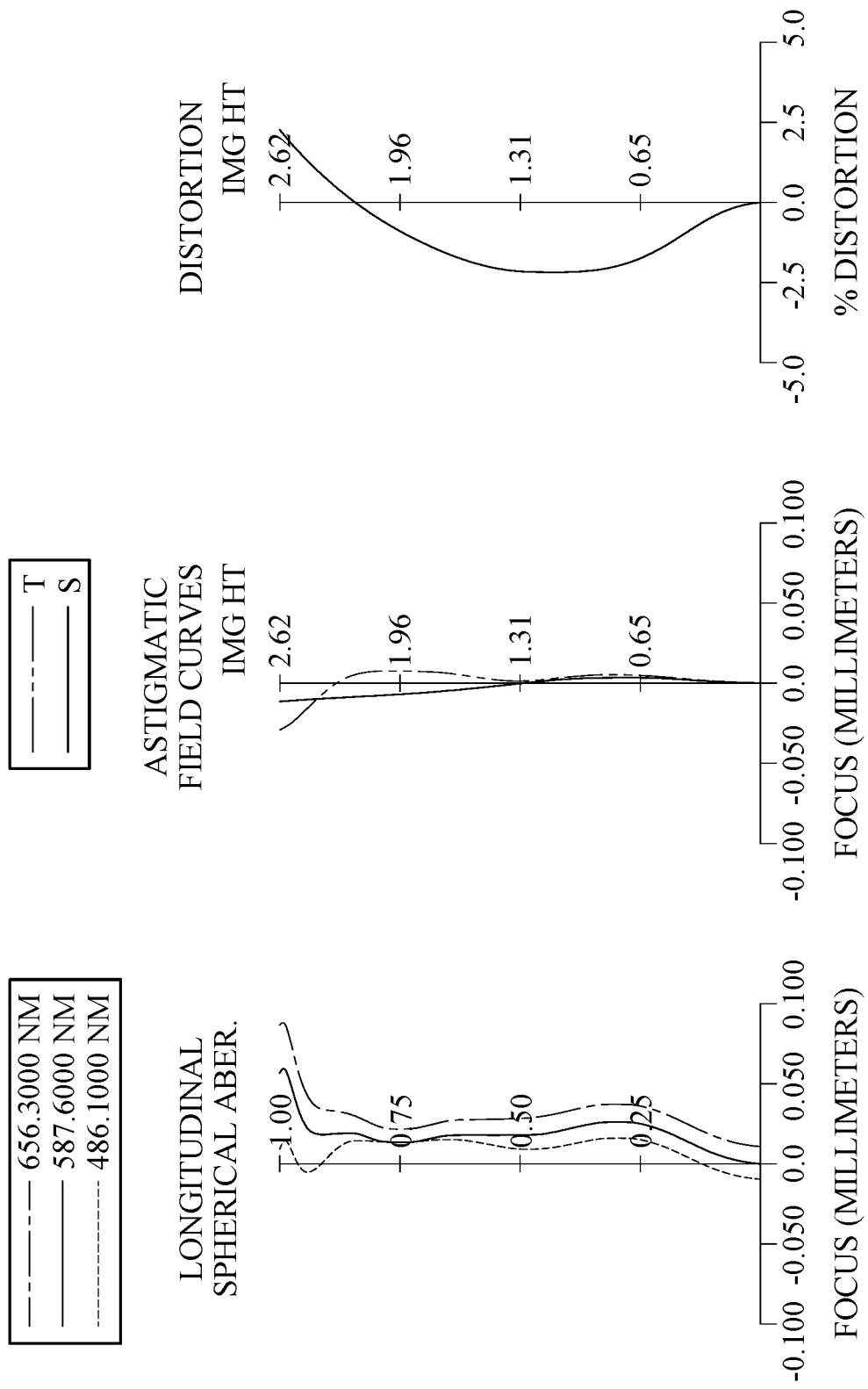
FIG. 16 shows spherical aberration curves, astigmatic field curves and a distortion curve of the image capturing unit according to the 8th embodiment.

FIG. 16 shows, in order from left to right, spherical aberration curves, astigmatic field curves and a distortion curve of the image capturing unit according to the 8th embodiment. In FIG. 15, the image capturing unit includes the photographing optical lens assembly (its reference numeral is omitted) of the present disclosure and an image sensor 880. The photographing optical lens assembly includes, in order from an object side to an image side, an aperture stop 800, a first lens element 810, a second lens element 820, a third lens element 830, a stop 801, a fourth lens element 840, a fifth lens element 850, an IR-cut filter 860 and an image surface 870. The photographing optical lens assembly includes five lens elements (810, 820, 830, 840 and 850) with no additional lens element disposed between each of the adjacent five lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric. The object-side surface 821 of the second lens element 820 has at least one inflection point in an off-axis region thereof. The image-side surface 822 of the second lens element 820 has at least one concave critical point in an off-axis region thereof.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has at least one convex critical point in an off-axis region thereof.

The fourth lens element 840 with negative refractive power has an object-side surface 841 being concave in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The IR-cut filter 860 is made of glass material and located between the fifth lens element 850 and the image surface 870, and will not affect the focal length of the photographing optical lens assembly. The image sensor 880 is disposed on or near the image surface 870 of the photographing optical lens assembly.

The detailed optical data of the 8th embodiment are shown in Table 15 and the aspheric surface data are shown in Table 16 below.

TABLE 15

8th Embodiment
f = 8.49 mm, Fno = 3.00, HFOV = 16.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.498 | | | | |
| 2 | Lens 1 | 1.934 | (ASP) | 1.091 | Plastic | 1.534 | 55.9 | 2.33 |
| 3 | | −2.805 | (ASP) | 0.049 | | | | |
| 4 | Lens 2 | −2.372 | (ASP) | 0.894 | Plastic | 1.633 | 23.4 | −13.89 |
| 5 | | −3.724 | (ASP) | 0.133 | | | | |
| 6 | Lens 3 | −4.328 | (ASP) | 0.221 | Plastic | 1.544 | 56.0 | −3.86 |
| 7 | | 4.152 | (ASP) | 0.008 | | | | |
| 8 | Stop | Plano | | 0.353 | | | | |
| 9 | Lens 4 | −100.000 | (ASP) | 0.200 | Plastic | 1.544 | 56.0 | −14.66 |
| 10 | | 8.671 | (ASP) | 2.302 | | | | |
| 11 | Lens 5 | −2.567 | (ASP) | 1.350 | Plastic | 1.566 | 37.4 | −13.66 |
| 12 | | −4.573 | (ASP) | 0.300 | | | | |
| 13 | IR-cut Filter | Plano | | 0.210 | Glass | 1.517 | 64.2 | — |
| 14 | | Plano | | 0.138 | | | | |
| 15 | Image | Plano | | — | | | | |

Note:
Reference wavelength is 587.6 nm (d-line).
An effective radius of the stop 801 (Surface 8) is 1.000 mm.
An effective radius of the object-side surface 851 (Surface 11) is 1.650 mm.

TABLE 16

Aspheric Coefficients

| Surface # | 2 | 3 | 4 | 5 | 6 |
|---|---|---|---|---|---|
| k= | −9.1897E−02 | −6.9780E+00 | −7.3841E−01 | 6.9837E+00 | 9.9577E+00 |
| A4 = | −4.1593E−03 | 1.0928E−01 | 1.8537E−01 | 2.3961E−01 | 1.0023E−01 |
| A6 = | 2.8079E−03 | −1.8699E−01 | −2.3165E−01 | −3.3407E−01 | −2.4732E−01 |

TABLE 16-continued

| Aspheric Coefficients | | | | |
|---|---|---|---|---|
| A8 = −9.0657E−03 | 1.8472E−01 | 2.2298E−01 | 5.1527E−01 | 6.0577E−01 |
| A10 = 7.8636E−03 | −1.0438E−01 | −1.2084E−01 | −5.2518E−01 | −7.6807E−01 |
| A12 = −3.9770E−03 | 2.8456E−02 | 2.5658E−02 | 3.5662E−01 | 4.9244E−01 |
| A14 = 6.2903E−04 | −6.9792E−04 | 5.3605E−03 | −1.6181E−01 | −1.2329E−01 |
| A16 = 1.8569E−05 | −8.7423E−04 | −2.6009E−03 | 4.8158E−02 | 1.1716E−02 |

| Surface # | 7 | 9 | 10 | 11 | 12 |
|---|---|---|---|---|---|
| k = | −9.0000E+01 | 9.0000E+01 | 3.0094E+01 | −3.3381E+00 | −5.9619E−01 |
| A4 = | −6.1354E−02 | −1.8100E−01 | −4.9825E−02 | −5.9898E−02 | −1.3038E−01 |
| A6 = | −1.5391E−01 | 4.2849E−02 | −1.5656E−02 | 8.9068E−02 | 1.5024E−01 |
| A8 = | 5.8646E−01 | −3.3850E−01 | 3.5620E−02 | −1.4183E−01 | −1.2403E−01 |
| A10 = | −1.1688E+00 | 7.1667E−01 | −2.0650E−01 | 1.4425E−01 | 6.6911E−02 |
| A12 = | 1.1193E+00 | −1.2808E+00 | 3.7225E−01 | −9.5053E−02 | −2.3603E−02 |
| A14 = | −5.1877E−01 | 1.1898E+00 | −2.4948E−01 | 4.0235E−02 | 5.3847E−03 |
| A16 = | 9.6707E−02 | −3.9342E−01 | 6.1511E−02 | −1.0597E−02 | −7.6481E−04 |
| A18 = | — | — | — | 1.5827E−03 | 6.1355E−05 |
| A20 = | — | — | — | −1.0168E−04 | −2.1129E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 8.49 | ΣAT/T45 | 1.24 |
| Fno | 3.00 | TL/f | 0.85 |
| HFOV [deg.] | 16.7 | |f1/f3| | 0.60 |
| FOV [deg.] | 33.4 | |f3/T45| | 1.68 |
| tan(FOV) | 0.66 | |f3/f2| | 0.28 |
| V/N | 14.31 | f/R3 | −3.58 |
| V4 + V5 | 93.4 | f/R8 | 0.98 |
| T45/(CT2 + CT3) | 2.06 | f/R9 | −3.31 |
| T45/Dr1r6 | 0.96 | |f/f3| − (|f/f2| + |f/f4| + |f/f5|) | 0.39 |

9th Embodiment

Figure 17:
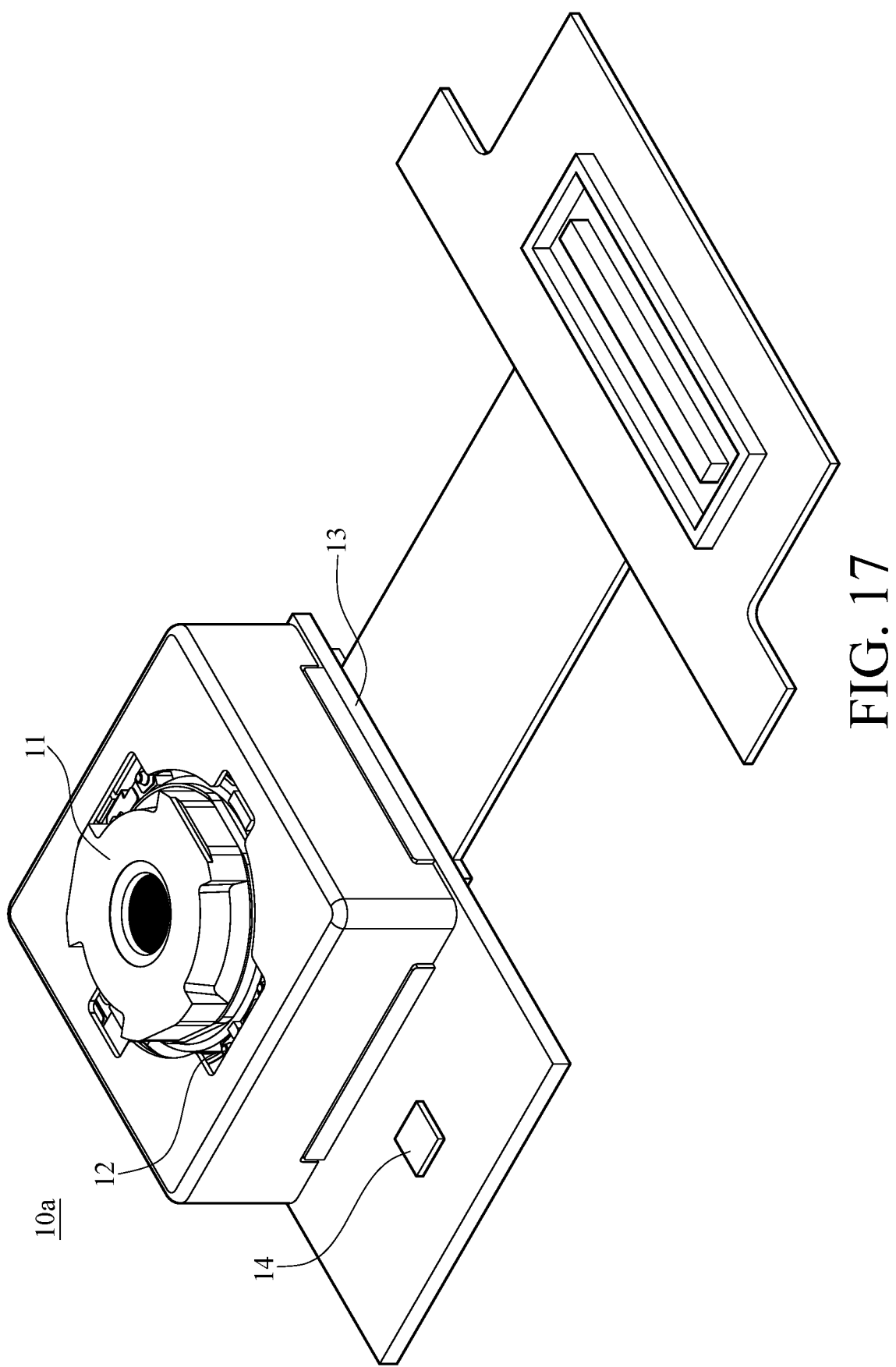
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10a is a camera module including a lens unit 11, a driving device 12, an image sensor 13 and an image stabilizer 14. The lens unit 11 includes the photographing optical lens assembly disclosed in the 1st embodiment, a barrel and a holder member (their reference numerals are omitted) for holding the photographing optical lens assembly. The imaging light converges in the lens unit 11 of the image capturing unit 10a to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
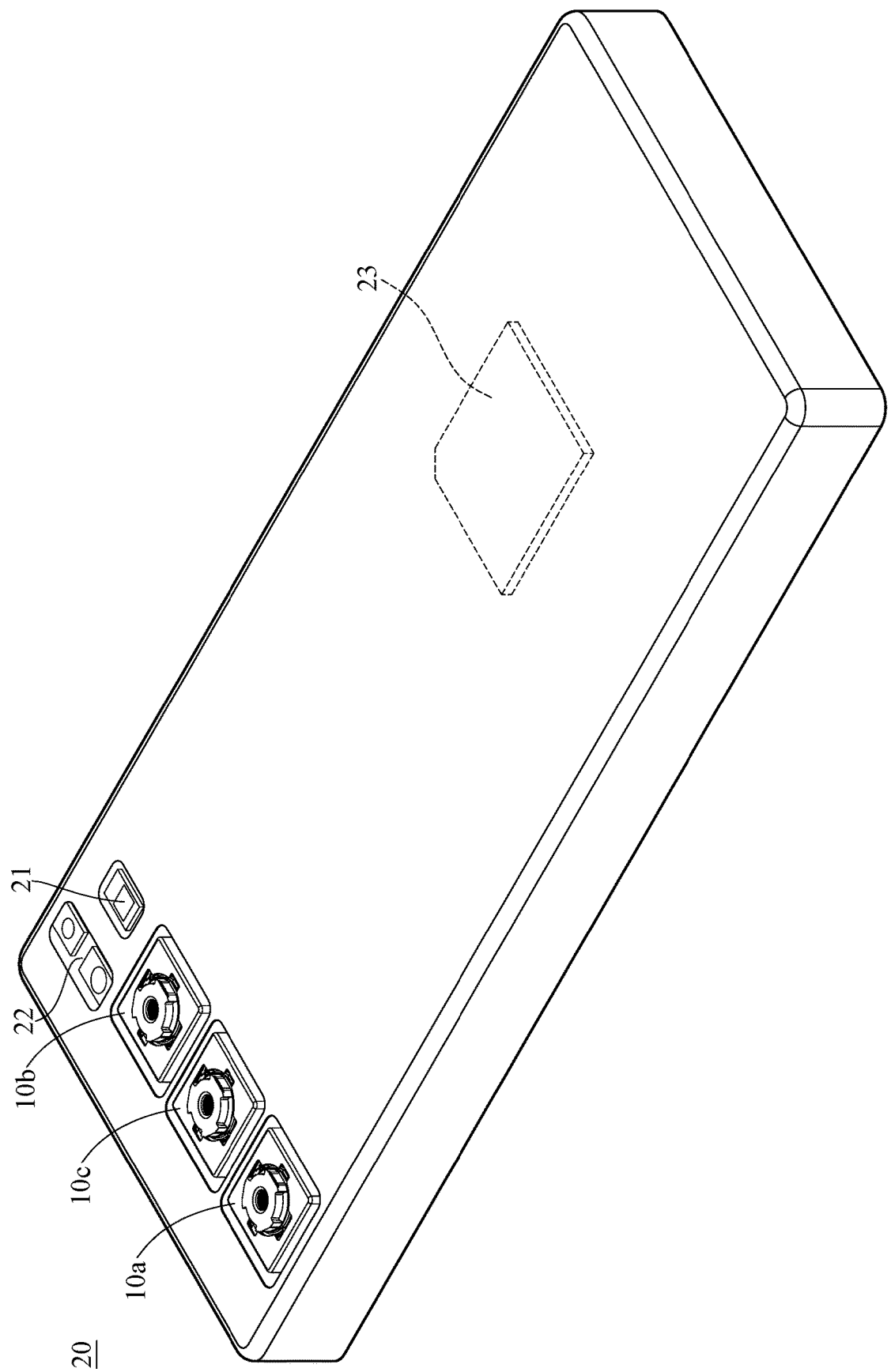
FIG. 18 is one perspective view of an electronic device according to the 10th embodiment of the present disclosure.
Figure 19:
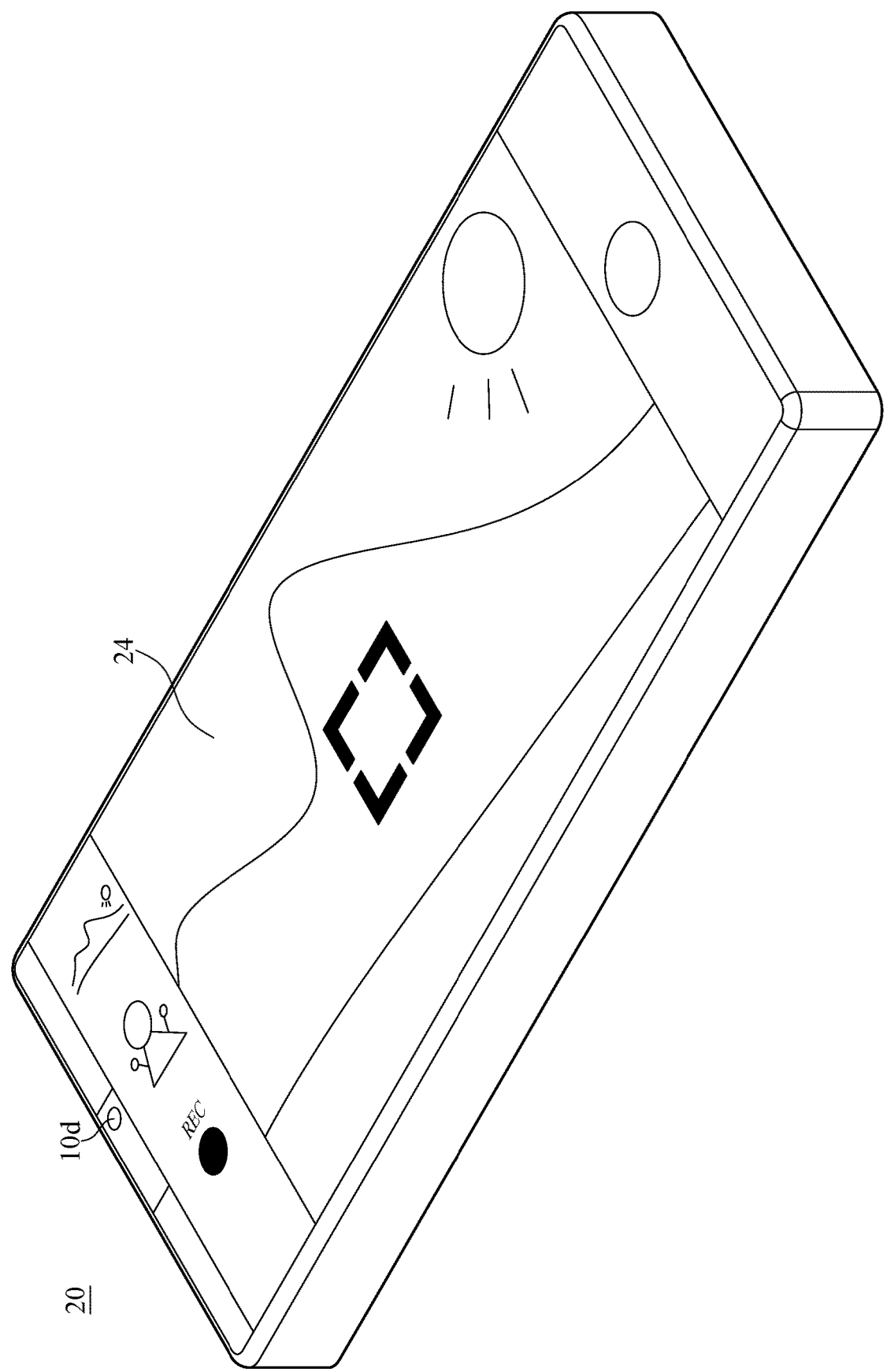
FIG. 19 is another perspective view of the electronic device in FIG. 18.
Figure 20:
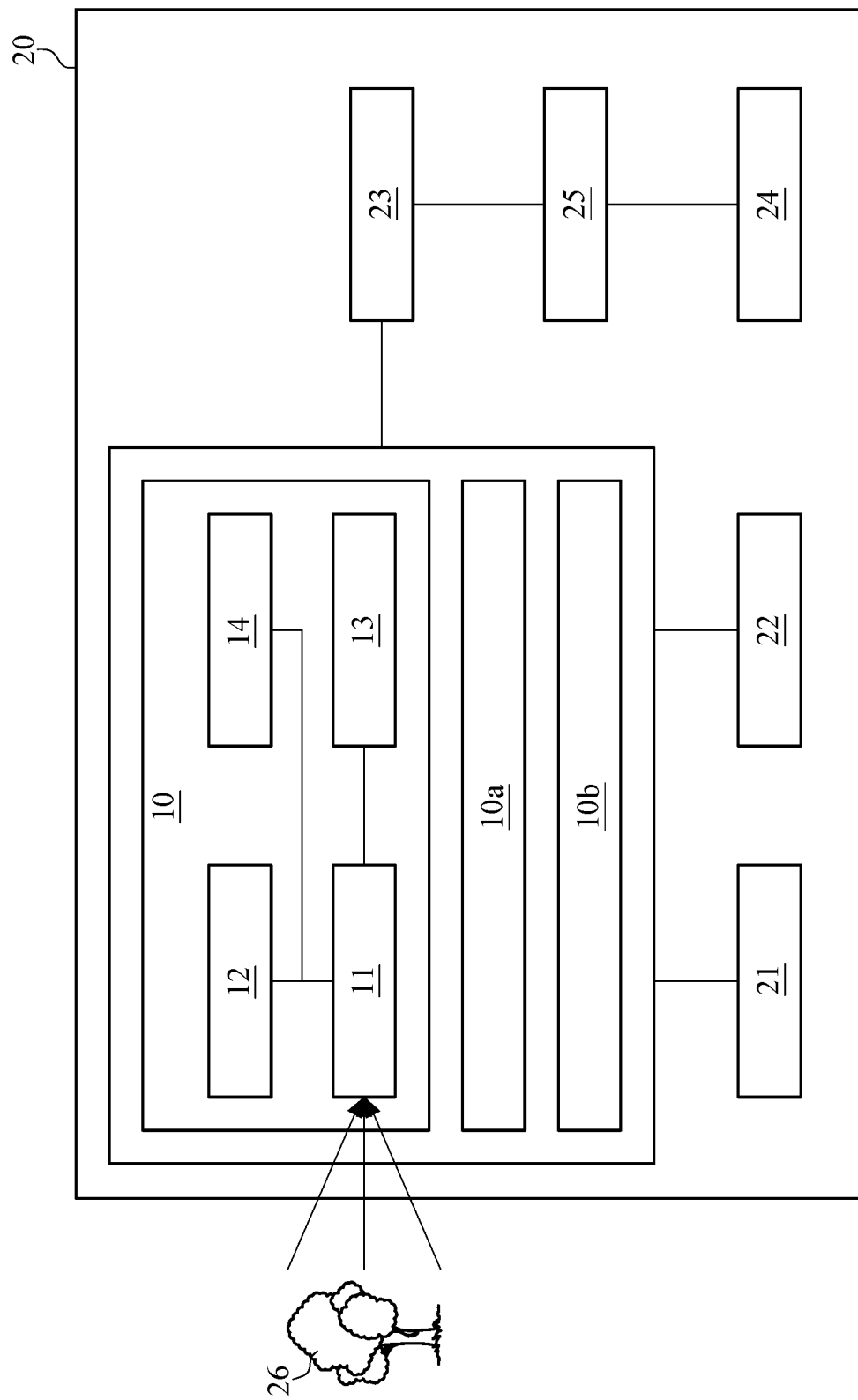
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 20 is a smartphone including the image capturing unit 10a disclosed in the 9th embodiment, an image capturing unit 10b, an image capturing unit 10c, a flash module 21, a focus assist module 22, an image signal processor 23, a user interface 24 and an image software processor 25. The image capturing unit 10a, the image capturing unit 10b and the image capturing unit 10c all face the same direction, and each of the image capturing units 10a, 10b and 10c has a single focal point. Furthermore, both the image capturing unit 10b and the image capturing unit 10c have a configuration similar to that of the image capturing unit 10a. In detail, each of the image capturing unit 10b and the image capturing unit 10c includes a lens unit, a driving device, an image sensor and an image stabilizer, and the lens unit includes a lens assembly, a barrel and a holder member for holding the lens assembly. As shown in FIG. 19, the electronic device 20 can further include an image capturing unit 10d facing the same direction as the user interface 24, such that the image capturing unit 10d is configured as a front camera for selfie.

In this embodiment, the image capturing units 10a, 10b and 10c have different fields of view (e.g., the image capturing unit 10a is a telephoto image capturing unit, the image capturing unit 10c is a wide-angle image capturing unit and the image capturing unit 10b has a field of view ranging between that of the image capturing unit 10a and the image capturing unit 10c), such that the electronic device 20 has various magnification ratios so as to meet the requirement of optical zoom functionality. In this embodiment, the electronic device 20 includes multiple image capturing units 10a, 10b and 10c, but the present disclosure is not limited to the number and arrangement of image capturing units.

When a user captures images of an object 26, the light rays converge in the image capturing unit 10a, the image capturing unit 10b or the image capturing unit 10c to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10a of the present disclosure installed in an electronic device, and the present disclosure is not limited thereto. The image capturing unit 10a can be optionally applied to optical systems with a movable focus. Furthermore, the photographing optical lens assembly of the image capturing unit 10a features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising five lens elements, the five lens elements being, in order from an object side to an image side:

a first lens element having positive refractive power;
a second lens element;
a third lens element having negative refractive power;
a fourth lens element; and
a fifth lens element having negative refractive power;
wherein the photographing optical lens assembly has a total of five lens elements, an axial distance between the fourth lens element and the fifth lens element is T45, an axial distance between an object-side surface of the first lens element and an image-side surface of the third lens element is Dr1r6, a focal length of the photographing optical lens assembly is f, a focal length of the first lens element is f1, a focal length of the second lens element is f2, a focal length of the third lens element is f3, a curvature radius of an object-side surface of the second lens element is R3, and the following conditions are satisfied:

$0.55 < T45/Dr1r6$;

$|f3/f2| < 1.40$;

$|f1/f3| < 1.0$; and $f/R3 < -1.25$.

2. The photographing optical lens assembly of claim 1, wherein an axial distance between the object-side surface of the first lens element and an image surface is TL, the focal length of the photographing optical lens assembly is f, and the following condition is satisfied:

$TL/f < 1.0$.

3. The photographing optical lens assembly of claim 1, wherein the second lens element has an image-side surface being convex in a paraxial region thereof.

4. The photographing optical lens assembly of claim 1, wherein the focal length of the photographing optical lens assembly is f, the curvature radius of the object-side surface of the second lens element is R3, and the following condition is satisfied:

$-5.0 < f/R3 < -2.0$.

5. The photographing optical lens assembly of claim 1, wherein the axial distance between the fourth lens element and the fifth lens element is T45, the axial distance between the object-side surface of the first lens element and the image-side surface of the third lens element is Dr1r6, and the following condition is satisfied:

$0.65 < T45/Dr1r6 < 2.0$.

6. The photographing optical lens assembly of claim 1, wherein a sum of axial distances between each of all adjacent lens elements of the photographing optical lens assembly is ΣAT, the axial distance between the fourth lens element and the fifth lens element is T45, and the following condition is satisfied:

$1.0 < \Sigma AT/T45 < 2.0$.

7. The photographing optical lens assembly of claim 1, wherein the focal length of the photographing optical lens assembly is f, a curvature radius of an image-side surface of the fourth lens element is R8, and the following condition is satisfied:

$0.75 < f/R8$.

8. The photographing optical lens assembly of claim 1, wherein the third lens element has an object-side surface being concave in a paraxial region thereof, and the object-side surface of the third lens element has at least one convex critical point in an off-axis region thereof.

9. The photographing optical lens assembly of claim 1, wherein the object-side surface of the second lens element has at least one inflection point in an off-axis region thereof.

10. The photographing optical lens assembly of claim 1, wherein the focal length of the second lens element is f2, the focal length of the third lens element is f3, and the following condition is satisfied:

$|f3/f2|<0.50.$

11. The photographing optical lens assembly of claim 1, wherein the fourth lens element has an image-side surface being concave in a paraxial region thereof, and the fifth lens element has an object-side surface being concave in a paraxial region thereof.

12. The photographing optical lens assembly of claim 11, wherein the focal length of the photographing optical lens assembly is f, a curvature radius of an object-side surface of the fifth lens element is R9, and the following condition is satisfied:

$f/R9<-1.0.$

13. The photographing optical lens assembly of claim 1, wherein the focal length of the photographing optical lens assembly is f, the focal length of the second lens element is f2, the focal length of the third lens element is f3, a focal length of the fourth lens element is f4, a focal length of the fifth lens element is f5, and the following condition is satisfied:

$0<|f/f3|-(|f/f2|+|f/f4|+|f/f5|).$

14. The photographing optical lens assembly of claim 1, wherein the third lens element has an object-side surface being concave in a paraxial region thereof, and the image-side surface of the third lens element is concave in a paraxial region thereof.

15. The photographing optical lens assembly of claim 1, wherein a maximum field of view of the photographing optical lens assembly is FOV, an Abbe number of the fourth lens element is V4, an Abbe number of the fifth lens element is V5, and the following conditions are satisfied:

$\tan(FOV) \leq 1.0;$ and $90<V4+V5.$

16. The photographing optical lens assembly of claim 1, wherein the axial distance between the fourth lens element and the fifth lens element is T45, a central thickness of the second lens element is CT2, a central thickness of the third lens element is CT3, and the following condition is satisfied:

$1.75<T45/(CT2+CT3)<4.0.$

17. The photographing optical lens assembly of claim 1, wherein the focal length of the third lens element is f3, the axial distance between the fourth lens element and the fifth lens element is T45, and the following condition is satisfied:

$|f3/T45|<4.0.$

18. The photographing optical lens assembly of claim 1, wherein a minimum value of each ratio of an Abbe number to a refractive index among all lens elements of the photographing optical lens assembly is V/N, and the following condition is satisfied:

$5.0<V/N<12.0.$

19. An image capturing unit, comprising:
the photographing optical lens assembly of claim 1; and
an image sensor disposed on an image surface of the photographing optical lens assembly.

20. An electronic device, comprising:
the image capturing unit of claim 19.

21. A photographing optical lens assembly comprising five lens elements, the five lens elements being, in order from an object side to an image side:
a first lens element having positive refractive power;
a second lens element;
a third lens element having negative refractive power;
a fourth lens element; and
a fifth lens element having negative refractive power;
wherein the photographing optical lens assembly has a total of five lens elements, a focal length of the photographing optical lens assembly is f, a focal length of the first lens element is f1, a focal length of the second lens element is f2, a focal length of the third lens element is f3, an axial distance between the fourth lens element and the fifth lens element is T45, an axial distance between an object-side surface of the first lens element and an image-side surface of the third lens element is Dr1r6, an axial distance between the object-side surface of the first lens element and an image surface is TL, and the following conditions are satisfied:

$|f3/f2|<1.0;$ $0.60<T45/Dr1r6;$ $|f1/f3|<1.0;$ and $TL/f<1.0.$

22. The photographing optical lens assembly of claim 21, wherein the second lens element has an image-side surface being convex in a paraxial region thereof.

23. The photographing optical lens assembly of claim 21, wherein the focal length of the second lens element is f2, the focal length of the third lens element is f3, and the following condition is satisfied:

$|f3/f2|<0.75.$

24. The photographing optical lens assembly of claim 21, wherein the focal length of the photographing optical lens assembly is f, a curvature radius of an object-side surface of the fifth lens element is R9, and the following condition is satisfied:

$f/R9<-1.0.$

25. The photographing optical lens assembly of claim 21, wherein the fourth lens element has an image-side surface being concave in a paraxial region thereof, and the fifth lens element has an object-side surface being concave in a paraxial region thereof.

26. The photographing optical lens assembly of claim 21, wherein a minimum value of each ratio of an Abbe number to a refractive index among all lens elements of the photographing optical lens assembly is V/N, and the following condition is satisfied:

$5.0<V/N<12.0.$

27. The photographing optical lens assembly of claim 21, wherein the focal length of the third lens element is f3, the axial distance between the fourth lens element and the fifth lens element is T45, and the following condition is satisfied:

$|f3/T45|<4.0.$

28. The photographing optical lens assembly of claim 21, wherein the focal length of the photographing optical lens assembly is f, the focal length of the second lens element is f2, the focal length of the third lens element is f3, a focal length of the fourth lens element is f4, a focal length of the fifth lens element is f5, and the following condition is satisfied:

$0 < |f/f3| - (|f/f2| + |f/f4| + |f/f5|)$.

29. The photographing optical lens assembly of claim 21, wherein the third lens element has an object-side surface being concave in a paraxial region thereof, and the object-side surface of the third lens element has at least one convex critical point in an off-axis region thereof.

30. The photographing optical lens assembly of claim 21, wherein the axial distance between the fourth lens element and the fifth lens element is T45, a central thickness of the second lens element is CT2, a central thickness of the third lens element is CT3, and the following condition is satisfied:

$1.75 < T45/(CT2+CT3) < 4.0$.

31. A photographing optical lens assembly comprising five lens elements, the five lens elements being, in order from an object side to an image side:
   a first lens element having positive refractive power;
   a second lens element;
   a third lens element having negative refractive power;
   a fourth lens element; and
   a fifth lens element having negative refractive power;
   wherein the photographing optical lens assembly has a total of five lens elements, a focal length of the photographing optical lens assembly is f, a focal length of the second lens element is f2, a focal length of the third lens element is f3, a focal length of the fourth lens element is f4, a focal length of the fifth lens element is f5, an axial distance between the fourth lens element and the fifth lens element is T45, an axial distance between an object-side surface of the first lens element and an image-side surface of the third lens element is Dr1r6, and the following conditions are satisfied:

$0.60 < T45/Dr1r6$; and $0 < |f/f3| - (|f/f2| + |f/f4| \pm |f/f5|)$.

32. The photographing optical lens assembly of claim 31, wherein the third lens element has an object-side surface being concave in a paraxial region thereof, and the object-side surface of the third lens element has at least one convex critical point in an off-axis region thereof.

33. The photographing optical lens assembly of claim 31, wherein a minimum value of each ratio of an Abbe number to a refractive index among all lens elements of the photographing optical lens assembly is V/N, and the following condition is satisfied:

$5.0 < V/N < 12.0$.

34. The photographing optical lens assembly of claim 31, wherein the focal length of the photographing optical lens assembly is f, the focal length of the second lens element is f2, the focal length of the third lens element is f3, the focal length of the fourth lens element is f4, the focal length of the fifth lens element is f5, and the following condition is satisfied:

$0.25 < |f/f3| - (|f/f2| + |f/f4| + |f/f5|) < 3.0$.

35. The photographing optical lens assembly of claim 31, wherein the focal length of the photographing optical lens assembly is f, a curvature radius of an object-side surface of the fifth lens element is R9, and the following condition is satisfied:

$f/R9 < -1.0$.

* * * * *